(12) United States Patent  
Walker

(10) Patent No.: US 7,861,163 B2
(45) Date of Patent: Dec. 28, 2010

(54) READING PRODUCT FABRICATION METHODOLOGY

(75) Inventor: Randall C. Walker, Rochester, MN (US)

(73) Assignee: Walker Reading Technologies, Inc., Rochester, MN (US)

( * ) Notice: Subject to any disclaimer, the term of this patent is extended or adjusted under 35 U.S.C. 154(b) by 1222 days.

(21) Appl. No.: 11/410,556

(22) Filed: Apr. 25, 2006

(65) Prior Publication Data

US 2008/0222518 A1 Sep. 11, 2008

Related U.S. Application Data

(63) Continuation of application No. 09/928,822, filed on Sep. 28, 2001, now Pat. No. 7,036,075, which is a continuation of application No. 09/016,902, filed on Feb. 2, 1998, now Pat. No. 6,279,017, which is a continuation-in-part of application No. 08/693,444, filed on Aug. 7, 1996, now Pat. No. 5,802,533.

(51) Int. Cl.
    *G06F 17/21* (2006.01)
(52) U.S. Cl. ....................... 715/256; 715/200
(58) Field of Classification Search .............. 715/256
    See application file for complete search history.

(56) References Cited

U.S. PATENT DOCUMENTS 5,442,795 A * 8/1995 Levine et al. .............. 715/775
5,600,765 A    2/1997 Ando et al.
6,002,798 A   12/1999 Palmer et al.
6,064,384 A *  5/2000 Ho ............................. 715/839

FOREIGN PATENT DOCUMENTS

| JP | 04-015872 | 1/1992 |
| JP | 05-101120 | 4/1993 |
| JP | 05-158401 | 6/1993 |
| JP | 06-309359 | 11/1994 |

\* cited by examiner

*Primary Examiner*—Doug Hutton
*Assistant Examiner*—Tionna Smith
(74) *Attorney, Agent, or Firm*—Nawrocki, Rooney, Sivertson, P.A.

(57) ABSTRACT

A computer executable process for simultaneous visual depiction of plural text hierarchies of a visually displayable machine readable text, including provisions for a visual cue as to a location of a user select text within the simultaneous visual depiction of plural text hierarchies is provided. A text hierarchy is extracted for a reader select text of a machine read text accessible by at least a data processing portion of a data processing and display system. Units of a select element of elements of the text hierarchy are formatted for display and displayed upon a display of the data processing and display system. A portion of text of the machine read text present in the select unit of a select element of elements of the text hierarchy is selected such that when said selected portion of text is present in a particular hierarchical representation, units the select element of elements of the text hierarchy are selectively of moved or positioned.

3 Claims, 27 Drawing Sheets

Fig. 2

| SE# | ELEMENT | TYPE | PM CAT. | WORD POS, DICT | WORD POS, MG | WORD CAPIT-ALIZED | # CHAR-ACTERS | # SYLLA-BLES | PRON-UNCIA-TION TIME, SECONDS | EDUC-ATION LEVEL |
|---|---|---|---|---|---|---|---|---|---|---|
| 1 | I | W | | PRON. | | YES | 1 | 1 | .5 | 1 |
| 2 | | S | | | | | | | | |
| 3 | had | W | | VERB | | | 3 | 1 | .25 | 1 |
| 4 | | S | | | | | | | | |
| 5 | a | W | | ARTICLE | | | 1 | 1 | .25 | 1 |
| 6 | | S | | | | | | | | |
| 7 | farm | W | | N-V-A | NOUN | | 4 | 1 | .75 | 1 |
| 8 | | S | | | | | | | | |
| 9 | in | W | | PREP | | | 2 | 1 | .25 | 1 |
| 10 | | S | | | | | | | | |
| 11 | Africa | W | | NOUN | | YES | 6 | 3 | 1.0 | 3 |
| 12 | , | PM | COMMA | | | | 1 | | .5 | |
| 13 | | S | | | | | | | .5 | |
| 14 | at | W | | PREP | | | 2 | 1 | .25 | 1 |
| 15 | | S | | | | | | | | |
| 16 | the | W | | ARTICLE | | | 3 | 1 | .25 | 1 |
| 17 | | S | | | | | | | | |
| 18 | foot | W | | N-V-A | NOUN | | 4 | 1 | .5 | 1 |
| 19 | | S | | | | | | | | |
| 20 | of | W | | PREP | | | 2 | 1 | .25 | 1 |
| 21 | | S | | | | | | | | |
| 22 | the | W | | ARTICLE | | | 3 | 1 | .25 | 1 |
| 23 | | S | | | | | | | | |
| 24 | Ngong | W | | NOUN | | YES | 5 | 2 | 1.0 | 12 |
| 25 | | S | | | | | | | | |
| 26 | Hills | W | | NOUN | | YES | 5 | 1 | .75 | 2 |
| 27 | | PM | PERIOD | | | | | | .5 | |

*Fig. 3*

The geographical position,
and the height of the land,
combined to create a landscape
that had not its like
in all the world.

*Fig. 4*

The geographical position,
and the height
of the land,
combined to create a landscape
that had not its like
in all the world.

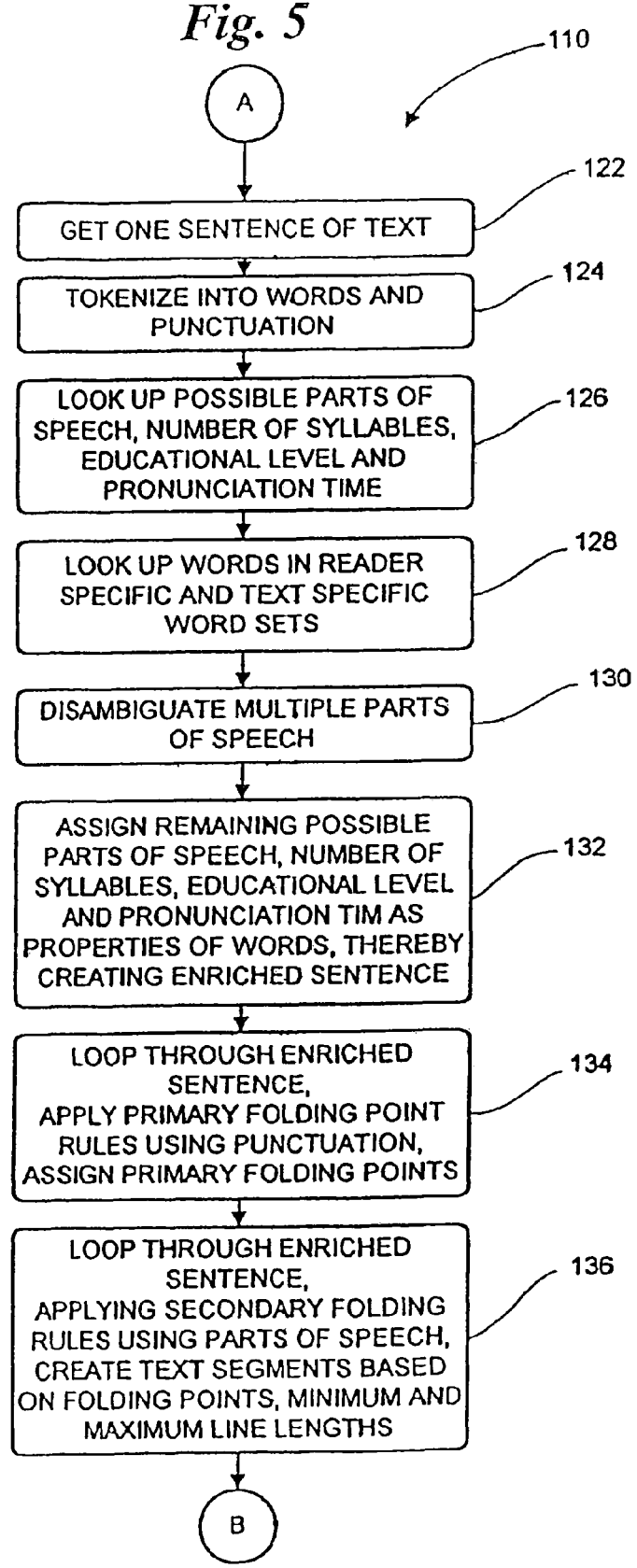

*Fig. 6*

| CLASS 1, SUBCLASS 1 PREPOSITIONS | AMID, BESIDES, AGAINST, AMONG, ABOUT, BY (WITH GERUND), DURING, SINCE, THROUGHOUT, WITHIN, UNTO, ALONG, EXCEPT, AROUND, THROUGH, UNTIL, WITHOUT |
|---|---|
| CLASS 1, SUBCLASS 2 CONJUNCTIONS | ALTHOUGH, AS THOUGH, UNLESS, UNTIL, AS IF, SO THAT, IN ORDER THAT, BECAUSE, BUT |
| CLASS 1, SUBCLASS 3 RELATIVE PRONOUNS | TO WHOM, TO WHOEVER |
| CLASS 1, SUBCLASS 4 OTHER | RATHER THAN, IN LIEU OF, INSTEAD OF |
| CLASS 2, SUBCLASS 1 PREPOSITIONS | ABOVE, BEFORE, BENEATH, BETWEEN, UP, ACROSS, TOWARD, UPON, AFTER, UNDER, TO (WITH VERB) |
| CLASS 2, SUBCLASS 2 CONJUNCTIONS | WHEN, WHERE, WHENEVER, WHEREVER, WHILE, AND (WITH RESTRICTIONS), OR (WITH) RESTRICTIONS), IF |
| CLASS 2, SUBCLASS 3 RELATIVE PRONOUNS | WHAT, WHOM, WHICH, WHO, WHOSE |
| CLASS 2, SUBLCLASS 4 OTHER | NOUN/VERB INTERFACES, ADVERBS FOLLOWING A VERB |
| CLASS 3, SUBCLASS 1 PREPOSTIONS | FOR, AT, TO (WITH NON-VERBS), WITH, OF, IN, BY (WITHOUT GERUND), FROM, ON |

*Fig. 8*

```
// SP = SUPER-PHRASE
// SFR = SECONDARY FOLDING RULE
// MIN = MINIMUM LINE LENGTH
// MAX = MAXIMUM LINE LENGTH

FOR ALL SP IN SENTENCE
    FOR ALL LEVELS OF SFR, FROM LOW TO HIGH
        FOR ALL WORDS IN SP, FROM LEFT TO RIGHT
            IF RESULTING TEXT SEGMENT WOULD BE > MIN
                APPLY SFR, CREATING NEW TEXT SEGMENT
            ELSE
                DO NOT APPLY SFR THEREBY \
                ADDING TO LENGTH OF NEXT \
                TEXT SEGMENT
            ENDIF
        END FOR ALL WORDS IN SP
    END FOR ALL LEVELS OF SFR
END FOR ALL SP IN SENTENCE

FOR ALL TEXT SEGMENTS CREATED
    WHILE TEXT SEGMENT LENGTH IS > MAX
        APPLY COLLAPSE RULE THEREBY \
            CREATING MULTIPLE TEXT SEGMENTS
    END WHILE
END FOR ALL TEXT SEGMENTS CREATED
```

*Fig. 11*

```
I
  had
    a
      farm
          in
              Af —206
              Afri —207
              ca,
```
— 200

```
  at
    the
      foot
```
— 202

```
  of
    the
      N
        gong — 208
        gong — 209
            Hills.
```
— 203

| SP. | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|
| X | Lane 1 | | | | Lane 2 | | | | Lane 3 | | | | Lane 4 | | | | Lane 5 | | | |
| Slot | A | B | C | D | A | B | C | D | A | B | C | D | A | B | C | D | A | B | C | D |
| b10 | Lane 1 used for punctuation mark-directed indents only: see steps 1-15 | | | | | X | | | | X | | | | X | | | | X | | |
| b20 | | | | | | X | | | | X | | | | X | | | | X | | |
| b30 | | | | | | X | | | | X | | | | X | | | | X | | |
| b40 | | | | | | | X | | | | X | | | | X | | | | X | |
| b45 | | | | | Beginning of word in B: text after word on new row in D | | | | | | | | | | | | | | | |
| b50 | | | | | | X | | | | X | | | | X | | | | X | | |
| b60 | | | | | | X | | | | X | | | | X | | | | X | | |
| b70 | | | | | | | X | | | | X | | | | X | | | | | | X |
| b80 | | | | | | | X | | | | X | | | | X | | | | | | X |
| b85 | | | | | Beginning of word in B: text after word on new row in D | | | | | | | | | | | | | | | |
| b90 | | | | | | | X | | | | X | | | | X | | | | | | X |

FIG. 12

| Head | Tail 350 | | | |
|---|---|---|---|---|
| Description of circumstances at beginning (Head) of segment (Tail), to right. | H<br>Split between words | I<br>Comma, doubledash, parenthetical or quotation marks at end of segment | J<br>Colon, semicolon, or ellipse, at end of segment | K<br>End of sentence |
| A — Beginning of Sentence | A-H | A-I | A-J | A-K |
| B — Colon, semicolon or ellipse preceding the segment | B-H | B-I | B-J | B-K |
| C — Comma, doubledash, parenthetical or quotation marks at beginning of, or preceding segment | C-H | C-I | C-J | C-K |
| D — Words b10-b39 on Hinge Word list | D-H | D-I | D-J | D-K |
| E — Words b40-b49 on Hinge Word list | E-H | E-I | E-J | E-K |
| F — Words b50-b79 on Hinge Word list (verbs) | F-H | F-I | F-J | F-K |
| G — Words b80-b95 on Hinge Word list | G-H | G-I | G-J | G-K |

Four score and seven years ago.
our fathers brought forth
upon this continent a new nation:
conceived in liberty,
and dedicated to the proposition
that all men are created equal.

- 280 — brought forth
- 288
- 286 — our fathers
- 284 — seven years ago.
- 282 — Four score and

FIG. 26

- 290 — on this continent
- 288 — brought forth
- 286 — our fathers
- 284 — seven years ago

READING PRODUCT FABRICATION METHODOLOGY

REFERENCE TO PRIOR APPLICATION

This application is a continuing application filed under 37 CFR §1.53(b) of application Ser. No. 09/928,822 filed Sep. 28, 2001, now U.S. Pat. No. 7,036,075 which is a continuation of application Ser. No. 09/016,902 filed Feb. 2, 1998, now U.S. Pat. No. 6,279,017, which is a continuation-in-part of application Ser. No. 08/693,444, filed Aug. 7, 1996, now U.S. Pat. No. 5,802,533.

FIELD OF THE INVENTION

The present invention relates to computer assisted text presentation. More specifically, the invention relates to enhanced text presentation using content specific attributes to improve the reading experience.

BACKGROUND OF THE INVENTION

The purpose of reading is to make an impact on the mind of the reader. This is true whether the text being read comprises a novel or a heads-up aircraft display. Material presented in a non-textual medium conveys information well suited to human absorption beyond the corresponding, one-dimensional text. Still pictures present object attributes such as colors, relative sizes, relative locations, patterns, groupings, and hierarchies. An object is viewed in a context. For example, a picture of a small object located with others in a corner conveys different information than the same object, enlarged, by itself, and in the center. Beginning sentences and paragraphs add contextual information by their location alone. Moving pictures have movement and temporal change as added attributes. Much information comes into the brain visually and through pattern recognition. Other information comes as audio information, conveying information through tone, changing inflection, and changing volume level.

Computer presentation of text for human reading has failed to utilize much of the human brain. As a result, only a part of the possible bandwidth is utilized, and computer text presentation is often thought of as unfriendly, constant, mechanical, and generally lacking in some way. When given the choice, most people prefer to read a book in print rather than a book on a computer screen. Current computer text presentation is poor relative to a book, and even poorer relative to its potential.

Some work has been done in computerized text presentation. Huanng (U.S. Pat. No. 4,880,385) discloses an opto-mechanical speed reading device that allows viewing text printed on paper through a viewing window one line at a time, automatically advancing lines.

Advances have been made in methods for the computerized parsing of natural language into parts of speech. Schabes et al. (U.S. Pat. No. 5,475,588), disclose an improved parsing system for creating parse trees. Black, Jr. et al. (U.S. Pat. No. 5,331,556) disclose a method for storing parts of speech information in a file along with the original text for improved subsequent searching of the text. Okamoto et al. (U.S. Pat. No. 4,661,924), and Church (U.S. Pat. No. 5,146,405) disclose methods for disambiguating multiple-parts-of-speech. Zamora et al. (U.S. Pat. No. 4,887,212), van Vliembergen (U.S. Pat. No. 5,068,789), Hemphill et al. (U.S. Pat. No. 5,083,268) disclose methods for parsing natural language text. All of the above cited patents are herein incorporated by reference.

Reading is a complex process and there are many factors that determine differences in reading performance between readers and even for the same reader on different occasions. These include innate neurophysiological conditions such as dyslexia, but also age; behavioral and motivational factors; level of education and prior reading practice; and perceptual constraints. A reader may also have different reading objectives that will affect how he/she approaches the reading material. Despite all of the above, text is presented by computers, at worst, as one dimensional "beads on a string", at best, similar to the two dimensional text presented by books. Indeed, whether text is presented in print or on an electronic display matters little because the text presentation is essentially identical.

Examples of the constant presentation of text are numerous. Topic sentences are presented the same as other sentences in a paragraph. Technical words are presented no different than non-technical words. Adjectives appear the same as nouns. Educationally difficult terms are presented the same as simple terms. The last paragraph in a chapter is presented the same as the first paragraph. Text is presented in left justified, broken lines of constant width requiring a jerking eye movement from far right to far left at regular intervals. Text is broken in mid-sentence, mid-phrase and mid-thought, applying ancient typesetting rules. Such text forces the eye to travel back and forth over large distances, mimicking a typewriter carriage. Text is advanced manually, broken into chunks determined by how many lines can fit on the screen.

There are several good reasons for not placing only one enhanced sentence per page in a book. These reasons may have been inappropriately carried over into the computer display of text. The possibility of modifying text presentation to enhance the reader's ability to read text by harnessing the power of digital manipulation appears to have been overlooked by those most knowledgeable in computing.

What would be desirable is a method for displaying the location of text with in relation to the text hierarchies within which the text resides. A method for displaying text on opposed pages which allows reading text without waiting for page changes would also be desirable. A text display system making use of the natural human ability and preference to move forward while viewing objects would be useful. A method for displaying text using quantitative color modification to transparently represent the cumulative relationships between larger sentence fragments and the words within would be desirable.

In order to preserve all of the information in an author-written text, text presentation, by definition, must systematically present the sequence of words written by the author in an unambiguous structure. It is also desirable that the additional information to be depicted in enhanced text presentation for improved reading would be incorporated into the requisite processes of text presentation itself, (i.e., placing characters against a contrasting background at various locations in space and time), rather than introducing additional symbols that require additional learning, reading and interpretation by the reader.

SUMMARY OF THE INVENTION

The present invention is directed to a text enhancement method and apparatus for the presentation of text for improved human reading. The invention includes extracting text specific attributes from machine readable text, varying the text presentation in accordance with the attributes, and creating a three dimensional (time and reading surface) visual product for enhancing the reading experience. The preferred embodiment of the invention extracts attributes such as parts of speech from an input sentence and displays that sentence in cascading text segments down and across the screen. The segmentation and horizontal displacement is determined by applying rules which utilize parts of speech, punctuation, and reader-preferences. The color of the text and background can also be varied depending on the parts of speech and on the position of sentences within paragraphs and paragraphs within chapters.

The invention adds meaningful visual attributes to enhance the presentation of computer displayed text above the constant and mechanical textual display of current systems. A meaningful visual cue is created that relates to the content of the new phrase and its relationship to the previous phrase. This cue is available before the text is read, giving context to the text. The sentence parsing processing uses the sentence's punctuation and content to create a system of meaningful visual cues including distinct phrases which promotes quicker recognition of the words in a phrase and their meanings. The enhanced sentence cascades down the page in a pattern of meaningful phrases determined by text content and reader preferences, the eyes moving a short distance from phrase to phrase.

A sentence represents a complete thought, and a paragraph represents a discrete subject or argument. Reading comprehension improves when one sentence appears at a time and when the transition from one paragraph to another is visually signalled and includes a pause for the appearance of these elements of text. The invention creates appropriate visual attributes to provide these visual signals. The visual attributes can include text segmentation, horizontal displacement of one line relative to another, text and background color, text brightness, and animation. The animation can include blinking and swiping, the time dependent, temporary, progressive brightening of elements of text, and the movement of text from standard to cascaded presentation.

In an exemplary reading session, the reader selects text to read, and informs the reading system the text type, e.g. a novel. The reading system retrieves the proper environment previously stored for that reader reading that selected text type. The reader has the opportunity to edit the reading rules and word sets but declines. Starting at the beginning of a chapter, where the reader left off, text is presented, one sentence at a time, cascaded down and across the screen. As the lines displayed are broken into meaningful text segments rather than arbitrarily ending at 80 characters, reading and comprehending an entire segment at a time is possible, with the resulting eye movement being from center of text segment to center of text segment, down and across the screen. The sentence background color is a function of the sentence position within the paragraph and the paragraph position within the chapter. Each of the sentences in a paragraph may have the same hue, but have incremental, but discernable changes in color saturation or darkness between sentences, and incremental, but discernible changes in hue between paragraphs. The background color thus provides non-literal positional information, signalling the beginning and end of a paragraph, and the beginning and end of a chapter.

Sentences are segmented according to reader approved rules. Each preposition folds a phrase in a predictable way, resulting in two text segments, each lying on a new line. The content of the line above effects the horizontal displacement of the line below. The same preposition folds and horizontally displaces text the same way whenever possible. As a result, the same preposition causes a similar pattern, long since familiar to the reader. Parts of speech effect the text color according to reader approved rules. As a result, both sentence structure and parts of speech are immediately recognizable from pattern and color recognition, even before a word of text is recognized, providing visual, non-literal cues to the reader.

The sentences advance at a rate using a rule previously selected by the reader. The formula is a function of the text type, number or words, educational level, and number of syllables present in the line. The advancement rate is a little faster than the reader's comfortable rate, to increase comprehension. A longer pause between sentence presentations signals a new paragraph before it appears. The reader is able to easily interact with the reading system, holding difficult sentences on the screen longer, and speeding up or slowing down the presentation.

The above described exemplary reading session is exemplary, not limiting or exhausting the possible embodiments within the scope of the invention.

The enhancement process exploits the fact that the elements of text have non-literal qualities that can be used to produce a text presentation product in time and in space that is more meaningful and enhances the reader's ability to comprehend the literal meaning of the text to a greater degree than existing formats on computers or paper. The cascading of phrases down and across the screen imparts a visual corollary as to how the text might be experienced if heard from a live reading, without the reader having to subvocalize it. Reading such an enhanced text is almost like listening with the eyes, but as a total visual packet that is experienced almost simultaneously.

Another aspect of the invention includes recording actions of a reader-performer reading a text aloud and can include the recording of speaking, hand movement, eye movement, head movement, and mouth movement. The actions are preferably recorded and mapped to corresponding words in the text. The text display can be varied in accordance with the recorded actions. The text display attributes can include text displacement, font height, font thickness, inter-character spacing, inter-word spacing, and interline spacing.

Another aspect of the invention displays the location of text relative to the text unit hierarchies within which it resides by varying the tiling of planes or windows. The windows or planes representing the various hierarchies are tiled as a function of the rank of the text unit within the hierarchy. One embodiment alternately horizontally and vertically tiles the window sets for the text unit hierarchies.

Another aspect of the invention displays text on opposed pages such that reading of text across the opposed pages can occur without waiting for pagination. One method replaces the text content of each opposed page as the opposed page is read, without waiting for both opposed pages to be read.

Yet another aspect of the invention displays text having an original text sequence, from bottom to top, in perspective, such that reading the text from bottom to top appears to read the text from front to back. One embodiment scrolls the text smoothly forward such that the reader seems to be moving forward through the text while reading the text.

Still another aspect of the invention calculates the relationship between words and the larger text segments of which they are apart. One embodiment begins with a sentence and repeatedly subdivides the sentence into segments according to the relationships between the segments and sub-segments. The relationship between the segments and sub-segments is used to calculate a color value. The generation or level or recursion in the segmentation algorithm is also used to determine the color value. The calculated color value is used to display the color or each word or phrase.

BRIEF DESCRIPTION OF THE DRAWINGS

FIG. 2 is a table illustrating various attributes of the elements in one sentence;

FIG. 3 contains an example of enhanced text including cascade and right descent angles;

FIG. 4 presents the sentence of FIG. 3 as enhanced text including cascade and right and left descent angles;

FIG. 5 illustrates step 110 in detail;

FIG. 6 illustrates word sets establishing a hierarchy of secondary folding points;

FIG. 8 illustrates step 136 in detail;

FIG. 11 illustrates the sentence of FIG. 7 showing visual pronunciation of emphasized syllables.

FIG. 12 is a chart illustrating lanes and slots used in calculating horizontal displacement;

FIG. 14 illustrates rules for placement of text segments upon the curve of FIG. 13 as a function of the segment head and tail text attributes;

FIG. 15 illustrates an intermediate result of a text bending algorithm;

FIG. 25 illustrates a method for displaying text which enables reading from front to back, from bottom to top, and which can be made to appear to move forward;

FIG. 26 illustrates the text of FIG. 25 after forward movement of the text; and

DETAILED DESCRIPTION OF THE PREFERRED EMBODIMENTS

Figure 1:
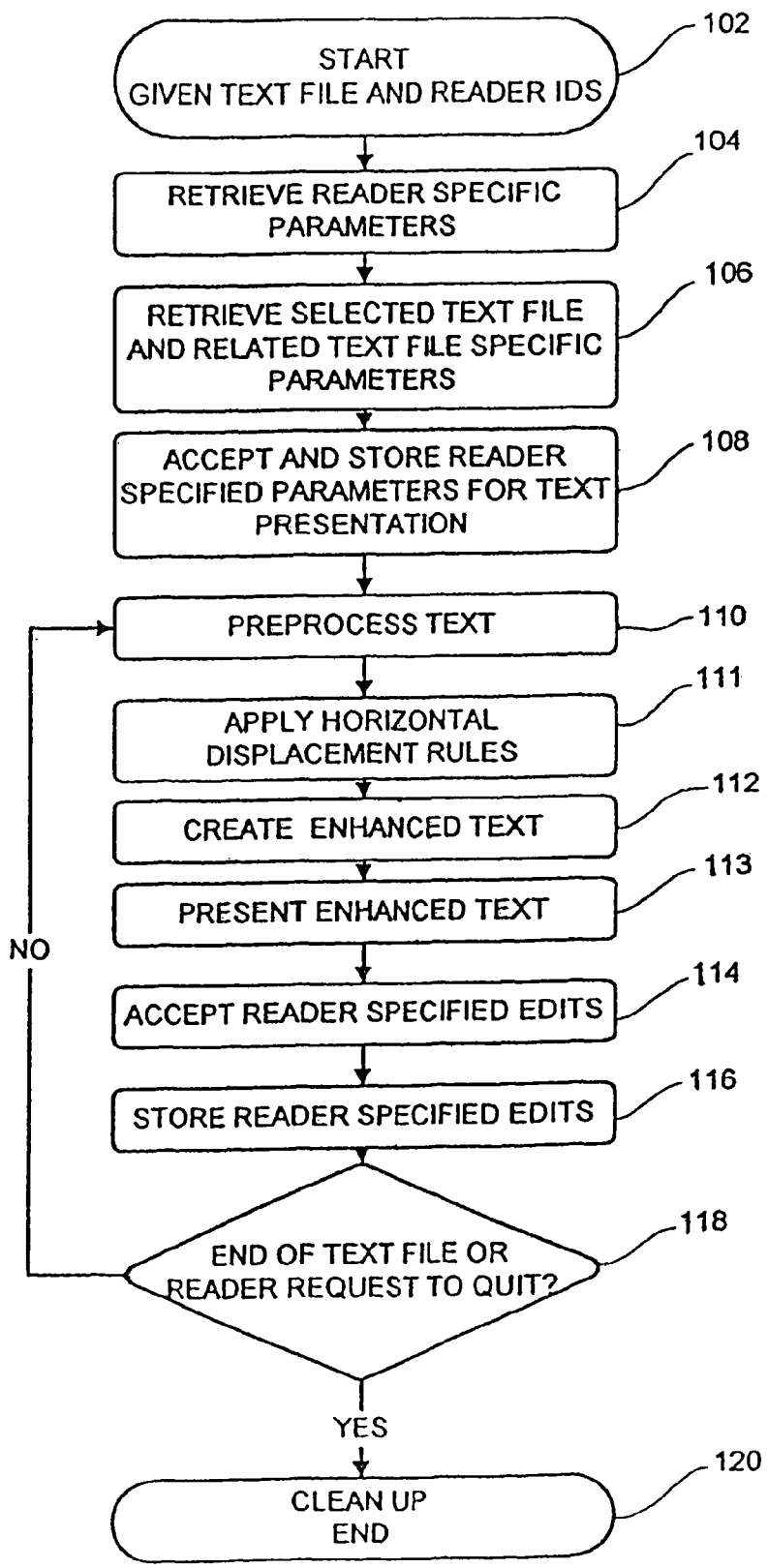
FIG. 1 is a high-level flow-chart of a method utilized in an embodiment of the invention.

FIG. 1 shows a high-level flow-chart of a method utilized in an embodiment of the invention. The steps in FIG. 1 and all such figures may of course be split into additional steps or merged into fewer steps and still describe the same embodiment.

In step 102, the reading device is started, and passed the identification (ID) of the reader and the text file identification to be read. In a preferred embodiment, the reader ID is obtained from the operating system. In another embodiment the reader is prompted for identification. In one embodiment, there is but one reader of the device assumed. Given the reader ID, reader specified parameters are retrieved in step 104. Parameters are discussed in detail below. Given the text ID, the text file and text specific parameters are retrieved in step 104. In a preferred embodiment, the parameters have default values, and do not require reader entry. In a most preferred embodiment, entry of reader preferred specific parameters is allowed, values accepted, and the parameter values stored as in step 108. In one embodiment, the user is allowed to pull down menus containing dialog boxes, view default parameters, and modify them using standard user interfaces including numerical entry, text entry, slide bars, and buttons. In a preferred embodiment, given suitable access permission, modification of global parameters applying to all readers of the text is also allowed. The reader is allowed to have parameters set for only the current text, all texts of the same type as the current text, or all texts read by this reader.

Reader specific parameters include: viewing field dimensions; color palette for background and text; word set inputs for rules; minimum phrase length; maximum line length; minimum and maximum text segment weight; descent angles; horizontal displacement rule inputs; horizontal justification preferences; inter-phrase gap length; advancement rate; inter-sentence and inter paragraph interval proportions; Tagging definitions; animation specifications; definitions of parameters to derive content dependent presentation intervals; definitions of parameters and weighting to derive phrase/text matter, weight, density, complexity, and content; and identities of special event scripts.

Viewing Field Dimensions

Viewing field dimensions can specify the size of the window for viewing text in the two X and Y dimensions and a third dimension, time. This field can include the entire screen or a smaller portion of the screen. The time dimension can include the time over which time dependent animations such as blinking occur.

Color Palette

Color palette for background and text allows specification of preferred background and text color that varies with the text. In a preferred embodiment, the hue and brightness of the background color vary with both sentence position within a paragraph, and paragraph position within a chapter. In a most preferred embodiment, the brightness is set at one level for the first sentence in a paragraph and a second level for the last sentence in the paragraph, with the brightness of each sentence in between progressing from the first level to the second level. In a preferred embodiment, the background hue is set at a first value for the first paragraph in a chapter and a second value for the last paragraph in a chapter, with the hue of each paragraph progressing from the first value to the second value. In a most preferred embodiment, the first hue is green and the second hue is violet.

In preferred embodiments, text color can vary with a word's categorical and continuous attributes. A categorical attribute is a function of the category a word fits into. In a most preferred embodiment, categories include parts of speech e.g. verb, and technical words. Continuous attributes include those that can be measured such as educational level e.g. twelfth grade, number of syllables, and word length. In a preferred embodiment, different parts of speech have different text colors. In a most preferred embodiment, text color is varied with background color to provide optimal, reader-preferred contrast.

Word sets can be used to specify some parts of speech. For example, "I" is a pronoun, "had" is a verb, "a" is an article, and "farm" could be a noun, verb, or adjective. The parts of speech need only be likely parts of speech as with the word "farm", which could be a noun, verb, or adjective. An example of the parts of speech in a single sentence is shown in FIG. 2. The multiple possible parts of speech column 150 is shown as is the disambiguated part of speech column 152.

Word sets are input in preferred embodiments utilizing two methods. The first method utilizes a structured text format such as Standard Generalized Mark-Up Language (SGML), allowing for import and export of large word sets and dictionaries from diverse sources. Standard SGML parsers are then utilized to store the word sets in a suitable database. The second method allows interactive editing of word sets using a hierarchy of pull menus and dialog boxes. In a preferred embodiment, the reader specified word sets are stored in a separate database from the dictionary or glossary word sets, to allow for separate storage, editing and faster retrieval.

Minimum Text Segment Length & Maximum Line Length

A preferred embodiment includes a reader specified minimum text segment length. A text segment is a piece of text that is presented on one line on a display. The minimum text segment length, which can be denominated in words, is the minimum the reader wishes to see on a separate line. A maximum line length is the maximum length the reader wishes to see on one line. Lengths can be measured in number of characters, words, syllables, educational level, or any sum of products of these. In one embodiment, the minimum line length is ten characters and the maximum line length is thirty five characters.

Phrase Weight

Phrase weight is a derived attribute of a phrase (text segment or potential text segment) giving some measure of the amount of material in a phrase. In one embodiment, the phrase weight is simply the number of words in a phrase. In preferred embodiment, phrase weight includes phrase density and phrase complexity. Phrase density can include the number of technical words or number of words exceeding a certain grade level. Phrase complexity can include the number of spelling similarities between words in a phrase, number of ambiguous words, and total weight of reader weight-specified words.

Minimum and Maximum Text Segment Weight

A preferred embodiment includes a reader specified minimum and maximum text segment weight. The text segment weight, is the quantity of text the reader wishes to see on a separate line. In preferred embodiments, the text segment weight is the sum of phrase weights within the text segment.

Horizontal Justification Rules

Horizontal justification rules specify the horizontal justification of a line of text relative to the line above. Justification can include the justification type for the line or phrase being positioned, i.e. right, left, or center justification. Justification can also include the text portion of the line above from which the justification is measured, i.e. the entire line of text versus or one phrase, the point of that portion used, e.g. left-most, right-most, or center. Horizontal justification in one embodiment is simply measured within the line being positioned rather than relative to the line above.

In a preferred embodiment, the first phrase on a line is center justified, measured from the center of the last phrase in the line immediately above. In another embodiment, the entire line of text is center justified below the center of the line of text above. In yet another embodiment, the text segment "center of gravity", calculated using the difficulty of each word, is used as the text segment center for justification purposes.

Descent Angle

A descent angle is the amount of horizontal displacement for each new line, modifying the horizontal position called for by the horizontal justification rules alone. By definition, each text segment is presented on a new line. In a preferred embodiment, the descent angle is specified in units of characters. The descent angle and horizontal justification at least partially determine the "text cascade" down and across the screen in preferred embodiments. An example of cascading text is illustrated in FIGS. 3 and 4. A descent angle may be zero, meaning that, without more, the text segment horizontal position is determined by the horizontal justification rules alone. A descent angle can be left, where the line below is to be shifted left relative to the line above, or right, where the text shifts right. FIG. 3 illustrates only right descent angles.

In one embodiment, the decent angle in a constant for each new line. In a preferred embodiment, the descent angle is a function of the text segment weight of the line above. In another preferred embodiment, horizontal justification rules call for center justification below the center of each line immediately above, and the descent angle is calculated to present a substantially straight path, when all text lines are presented, from center of line to center of line, from upper left to lower right on the display surface.

In a preferred embodiment, the inputs to descent angle rules include attributes of the text in the line above. In one preferred embodiment, inputs include the reason for folding the line above, i.e. primary folding point, secondary folding point, or collapse rule. In a preferred embodiment, a more positive descent angle is called for when the line immediately above folded due to a primary folding point than a secondary folding point. In another preferred embodiment, the inputs include the text segment weight of the current line and the line above.

It is recognized that the horizontal justification rule could call for left justification and measuring horizontal displacement from the left margin, as well as a zero descent angle, combing to result in left justified text on each line.

It is also recognized that horizontal text positioning can be accomplished in numerous equivalent ways to the above example. In particular, calculations of text position can be accomplished by first justifying then shifting, or first shifting then justifying with equivalent results.

Gap Length

In one embodiment, gaps are associated with folding points whose locations have been determined, but because of other rules, remain on the same line and do not cause folding. A gap of zero or more spaces is added after a folding point where that folding point has failed to cause new line creation. In a preferred embodiment, the gap length is a reader determined parameter, where a gap length of zero results in a no gaps being created. Gaps allow a visual cue as to the existence of phrases even where the phrases have not caused new line formation.

Advancement Rates

Advancement rates specify display duration times and the time intervals between the presentation of one grouping of text and the next. In a preferred embodiment, one sentence is presented on one screen. In a preferred embodiment, the display duration rate can be a function of the text's appropriately weighted number of words, educational level, pronunciation time, number of phrases, number of syllables, or phrase weight. Time intervals can include the interval between sentences and paragraphs. In a preferred embodiment, the time interval between sentences and paragraphs is different. In this way, the constant arrival rate of text in current systems can be replaced with a rate dependent on where the text lies and what the content of the text is.

Stations

Stations are display surface locations at which text is displayed. Stations may be identified windows within which text is presented or points at which text presentation begins. A preferred embodiment includes an active text station, where text being read is presented. Another preferred embodiment includes a pre-reading station displaying about to be read text and a post-reading station displaying already read text. In one embodiment, the total text presented at all stations on the viewing surface is controlled by the expected reading or pronunciation time. In one embodiment, only about one minute of material is allowed on the screen at any one time.

Animation

Animation is the time dependent presentation of text. Examples of animation include blinking, dissolving, and swiping, that is, the brightening of successive text portions at a specified rate. In a preferred embodiment, a modified scroll effect is accomplished by stacking about to be read text in flat rows at a pre-reading station at the top of the screen, stacking previously read rows at a post-reading station at the bottom of the screen, and cascading the active sentence at an active station across the middle of the screen. In one embodiment, pre-reading and post reading text and/or background colors differ from that of the currently being read text.

Tagging

Tagging includes designating whether a sentence will be tagged with a definition or a drawing related to the word. In a preferred embodiment, a word set specifies which words will be tagged with a definition. When a tagged word is selected by a reader, a definition, drawing or other electronic illustration of the word can be displayed. In a preferred embodiment, a tagged word, when selected, displays a pop-up window containing the definition or drawing. Preferred methods of selection include using a mouse and right shift button.

Reading Event

A reading event includes the appearance and disappearance of a sentence and any additional time before the appearance of the next sentence. A reading event contains a series of reading moments. A reading moment is a freeze frame appearance of text to the eyes of the reader trying to comprehend the text. To many readers, the reading moment will find the eye centered on a phrase, the phrase alone on a line, the reader comprehending the single phrase.

Reading Rate

The presentation interval is the duration of a sentence presentation on the screen. The presentation interval may be reader controlled or automatically determined. Reader control in one embodiment may be via mouse clicks. In another embodiment, reader control may be via eye movement detection or brain wave change detection. Brain wave detection operates by generating a new sentence request when the brain waves corresponding to reading activity change to brain waves associated with having finished reading the sentence.

Reading rate is measured in text content per unit of time. Such Text Content Units may be measured in length units such as number of words, syllables, pronunciation time, or any of previously discussed measures of phrase length or weight or any sum of products of these. Text Content Units may also be measured in complexity units such as those previously discussed with respect to phrase complexity or weight or any sum of products of these. The Text Content Units in a preferred embodiment are calculated for a presented sentence and used to compare the actual reading rate in Text Content Units per time with reader controlled presentation intervals, and to set the text presentation interval for automatically controlled text presentation intervals. In this way, the presentation interval can be made content dependent, and be made to track the likely reader preferred presentation rate.

Special Events

Special events are time dependent events that occur during the reading event. Special events include a visual or audible cue giving a time remaining signal. For example, when 75% of the content dependent presentation interval has elapsed, a visual cue would appear on the screen. Special events may be arranged by a special event script. Complex special events include a series of special events.

Visual Pronunciation

Visual pronunciation involves staggering in time the color or brightness changes of individual phrases, words, and syllables, though not necessarily all of these. One embodiment denotes emphasis on longer, more difficult words requiring longer to pronounce by using highlighting. Visual pronunciation is an example of a complex special event.

Pulling Down the Cascade

In one embodiment, text is displayed at a pre-reading station for a percentage of the content dependent presentation interval, then presented in a sentence cascade one text segment or one line at a time. Pulling down the cascade is an example of complex special event.

Non-Linear Text

Linear text is text presented and read from beginning to end. A book designed to be read from beginning to end is a common example of linear text. Non-linear text includes the presentation and reading of text in an order other than linear. One example of non-linear text is Hypertext, where certain words are presented in such a way to indicate linkage e.g. the text is angle bracketed or colored blue. Non-linear text presentation can be both reader directed and automatic. One example of this is automatic presentation of Hypertext in a depth first order, following the first Hypertext link, ignoring cycles. Another example is a breadth first presentation, presenting the first level of text, followed by any Hypertext links from the main level, followed by any Hypertext links from the first level, continuing until the lowest depth is reached or the reader intervenes. Yet another example is pruning either depth or breadth first presentation to include only portions having certain keywords of interest.

Magic Reading Glass

In one embodiment, text presentation may begin by presenting common, unformatted text. When the reader desires to see text presented as enhanced text, the reader designates a portion of text for enhancement by placing an icon such as a "magic reading glass icon" over some part of the sentence. That sentence and following sentences are presented as enhanced text. This enhanced text presentation continues until the reader deactivates the magic reading glass. This magic reading glass can serve as an alternate point of entry into the enhanced text processor.

Method

In FIG. 1, step 110, the text is preprocessed. Step 110 is shown in detail in FIG. 5. The text is parsed to identify paragraphs, sentences, words, and punctuation. Paragraphs may be identified by blank lines, paragraph markers, indentation characters, tab characters, or any other suitable characteristic in the text. Sentences may be identified using grammar rules including periods, spacing, capitalization of first words, and abbreviations or the lack thereof. In a preferred embodiment reading well behaved text, a period, question mark, or exclamation point, either alone or followed by a period, followed by two spaces or end of paragraph, signals the end of a sentence.

In step 124, the sentence is tokenized into words and punctuation. Original author specified emphasis, e.g. italics or underlining, is preserved in preferred embodiments. A standard lexical scanner such as Lex (TRADEMARK) is used in one embodiment, where the end of a word is denoted by grammar rules by white space or punctuation. Another embodiment utilizes a hand written lexical analyzer. One embodiment stores formatting characters such as tabs and indents as punctuation. The location of a word is preferably stored as an attribute of the word, to provide links to, and searching within, the original work.

A preferred embodiment also allows groups of words to be "clamped" together, and be recognized as a group of words. In one embodiment, such groups of words are recognized by the lexical scanner. In another embodiment, such words are recognized by a preprocessor preceding the lexical scanner to insure recognition as a phrase rather than as merely individual words. Clamped words, for example, "Prince of Whales", would be recognized as a single phrase, and preferably not broken by the preposition into two phrases displayed on two lines.

In step 126, the words are looked up in dictionaries, glossaries and tables to determine word attributes. The text is further processed to determine categorical and continuous attributes. In a preferred embodiment, important categorical attributes include parts of speech, and important continuous attributes include word location, education level, pronunciation time, and syllable number, location, sound, and vocal emphasis level. Identifying parts of speech with 100% accuracy would require extensive programming to determine the real-world context of the text. Such accuracy is not required to practice the invention, as errors are of minor consequence because the reader is a human, not a machine. The possible parts of speech are first determined by looking up the word in a dictionary or glossary. This dictionary or glossary need only have the likely parts of speech for a word, not a definition. For example, the word "farm" could be a noun, verb or adjective. A preferred embodiment stores the parts of speech attribute using a bitmap to preserve the multiple possible parts of speech. One embodiment explicitly stores an ambiguity attribute, indicating whether the word still has multiple possible parts of speech. Another embodiment uses the existence of more than a single possible part of speech as an ambiguity indication.

In a preferred embodiment, default parts of speech exist in a dictionary and may be looked up. In a most preferred embodiment, a word set may be added to override or supplement the default set. In another embodiment, technical words are specified by user entered word sets.

FIG. 6 illustrates nine word sets specifying parts of speech arranged in a hierarchy. Such word sets and hierarchies are also used as input to folding rules, described later. A preferred embodiment checks the word sets illustrated in FIG. 6, beginning with Class 1, Subclass 1, and ending with Class 3, Subclass 1. Search is terminated once a word or phrase is found. Given the limited vocabulary and static nature of the word sets in FIG. 6, a most preferred embodiment utilizes a fast, hand written parser to search for the words and phrases in FIG. 6. Preferred embodiments include parsers written in C, C++, Perl, compiled AWK, AWK and AWK to C, C with regular expression functions, or any suitable language. One parser embodiment utilizes YACC.

In one embodiment, the dictionary is a commercially available dictionary on electronic media such CD-ROM. The standard dictionary is parsed for word attributes such as parts of speech and number of syllables. As word definitions are not needed in many embodiments, storage of numerous words with associated number of syllables and parts of speech is possible. In a most preferred embodiment, the most commonly used and most recently used words are stored in fast access memory such a solid state Random Access Memory (RAM). In embodiments where dictionaries are to be hand crafted, a fast method utilizing hashing, collision detection and buckets is preferred. In embodiments where the word sets are fixed before reading, perfect hashing without buckets is preferred.

In yet another embodiment, the level of pronunciation emphasis is derived as an attribute depending in part on the part of speech. In a most preferred embodiment, pronunciation emphasis is categorized as primary, secondary, and none. In one embodiment, the pronunciation time and actual sound, e.g. as found in a sound file, are also retrieved from the dictionary or glossary and stored as attributes of the word.

In step 128, reader and text specific word sets are searched. In a preferred embodiment, the reader specified word sets are stored in a separate database from the dictionary or glossary word sets, to allow for separate storage and faster retrieval. In one embodiment, reader specified word sets are checked before dictionaries, and the dictionaries only checked if needed words and attributes are not found in the reader specified word sets. Preferred embodiments utilize a hierarchy of databases to look up words.

In step 130, multiple parts of speech are disambiguated. In one embodiment, a microgrammar is used to determine the likely parts of speech. A microgrammar utilizes adjacent or nearby words to more accurately determine the most likely part of speech for a word. For example, the word "farm" in the phrase "a farm in" would likely be a noun as it is preceded by an article and succeeded by a preposition. As another example, if a word could be either a noun or verb, and the word is preceded by "could", "will", "shall", or "to", then the word is likely a verb. If the word "farm" were preceded by "will", the word is likely a verb. In another embodiment, all disambiguation is done simply by choosing the statistically most likely use of the word. In yet another embodiment, there is no automatic disambiguation, only manual disambiguation using human editing. In a preferred embodiment, an attribute of ambiguity is stored for each word, indicating whether multiple possible parts of speech still exist after disambiguation. In yet another embodiment, an ambiguity attribute is not stored but derived from the existence of multiple possible parts of speech stored for a word. In one embodiment, ambiguity is inferred from the visual display of striped or alternating text colors associated with each part of speech. For example, if verbs are orange and adjectives are yellow, then a possible verb or adjective could have alternating yellow and orange stripes or text characters.

In one embodiment of the invention, parts of speech are determined in part by searching for morphemes (root words) and assigning part of speech attributes based on endings e.g. -ly, -ing.

In step 132, the attributes determined for the words and phrases are stored, creating an "enriched sentence", which will likely remain unchanged between readers. For example, the educational level and part of speech of a word will remain unchanged for different readers, even though they may desire different text segment lengths and presentations rates. In one embodiment, the enriched sentence is stored in persistent storage such as a file. In another embodiment, the enriched text is stored on CD-ROM. In a preferred embodiment, the enriched sentence is implemented as a linked list of nodes, each node having the word and phrase attributes described above including the position of the word in the original text.

Figure 7:
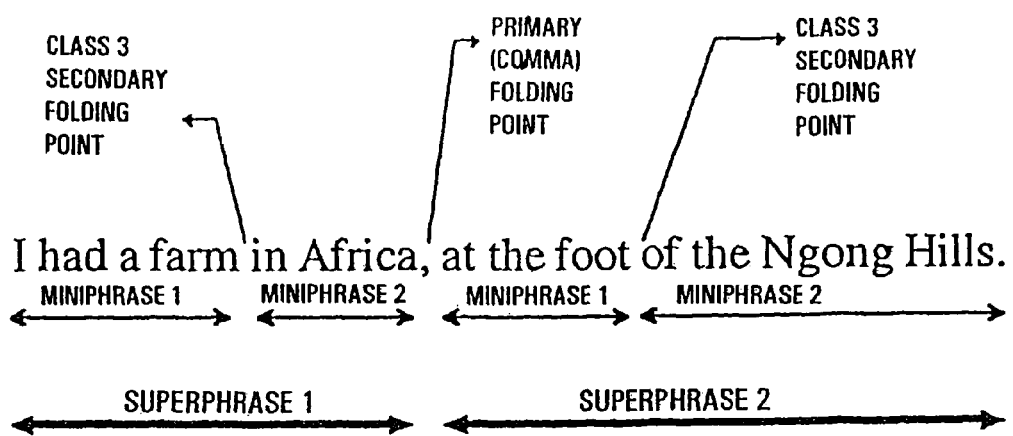
FIG. 7 illustrates folding point locations in a sentence.

In FIG. 5, step 134, primary folding points are determined by applying primary folding point rules. Folding points are text dividing points located between letters. In a preferred embodiment, folding points are classified as primary and secondary. Primary folding points are determined using primary folding rules which determine primary folding point locations based on punctuation marks. FIG. 7 illustrates a primary folding point after the comma following "Africa". Primary folding points divide text into "Super-phrases". In a preferred embodiment, primary folding points are located at every comma, colon, semi-colon, and left parenthesis, brace, and curly bracket. The folding point location can be stored as an attribute in a node in a linked list of nodes forming the enriched sentence.

Secondary folding points are determined applying secondary folding point rules. In preferred embodiments, secondary folding points and rules are ranked in a hierarchy and secondary folding rules accept parts of speech as inputs. In a most preferred embodiment, secondary folding rules include as rule inputs attributes of the text content of the text segments and phrases being processed. For example, a secondary folding point may be called for by a segment of text exceeding a reader preferred maximum text segment weight even though a maximum text segment length has not been reached.

Continuous attributes such as phrase difficulty, density, complexity, power and pronunciation time may be used as inputs to a rule modifying the ranking established by a table such as that of FIG. 6, using parts of speech alone to determine secondary folding part rankings. For example, a segment of text having a weight greater than 35 percent above the text average would have a Class rank of 1 assigned regardless of the rank otherwise called for by the table of FIG. 6. In one preferred embodiment, phrase weight or power is used exclusively to determine secondary folding point rankings, rather than solely parts of speech.

In an alternate embodiment, folding rules call for folding based on the number of characters on the line, and the parts of speech are displayed using colors corresponding to a word's part of speech. The later embodiment may not offer the advantages of cascading, but does offer visual display cues based on text content.

FIG. 6 illustrates a table used in a preferred embodiment to determine secondary folding points. For example, prepositions determine Class 3, Subclass 1, secondary folding points. In FIG. 7, there are class 3 secondary folding points before the prepositions "in" and "of". Secondary folding points divide Super-phrases into "Mini-phrases", as illustrated in FIG. 7. Mini-phrases are related to text segments in that Mini-phrases are often the same as text segments and are often displayed each on a new line. Once Mini-phrases are identified however, rules may dictate that more or less than one Mini-phrase appear as a text segment on a line.

Primary folding rules are applied first, followed by secondary folding rules, applied in order of the folding rule rank. An example of secondary folding rule ranking is shown in FIG. 6, established by the ranking of the word sets giving rise to the secondary folding points. Some preferred embodiments use either phrase weight or power to determine secondary folding point rank rather than solely using parts of speech. A most preferred embodiment allows reader entry of a preference for parts of speech or phrase weight/power determination of secondary folding point ranking. Some readers prefer text segmentation based on structure, while others prefer text segmentation based on complexity or estimated time to read a text segment.

In a preferred embodiment, secondary folding rules are applied only until a limit is reached. This limit is often the minimum line length. One method of determining the location of secondary folding points is shown in FIG. 5, step 136, and in detail in FIG. 8, step 136. In one embodiment, where the application of a secondary folding rule to a Super-phrase would result in a Mini-phrase length less than the minimum specified line length, the folding rule is not applied and no further folding rules are applied to that Super-phrase. Conversely, when no folding point would otherwise exist in a line exceeding the maximum line length, a collapse rule is applied, forcing the folding of the text into two lines. When all Super-phrases are to have no further folding rules applied, the folding process is complete.

In FIG. 1, step 111, the parameters, attributes, and folding rules can be used as input to the horizontal displacement rules. The horizontal displacement rules determine the horizontal location of the text segment. In a preferred embodiment, horizontal displacement rules include both horizontal justification rules and descent angle rules. Horizontal displacement in this embodiment is the sum of the results from the horizontal justification rule and the descent angle rule. In an easy to implement embodiment, the horizontal displacement rule is simply the descent angle as applied to the center justified text segment. Such an embodiment does not utilize the folding rule terminating the preceding text segment as input and provides minimum eye movement while reading the sentence cascade. Another embodiment adds left descent for preceding Class 1 folding points, and right descent for preceding Class 3 folding points. A preferred embodiment allows reader specified additional right or left displacement for folding points, including reader entered values for primary folding points, and each class and subclass of secondary folding points. One embodiment stores the added displacement in a table in units of characters. With the horizontal displacement determined, presenting the text remains.

Figure 9:
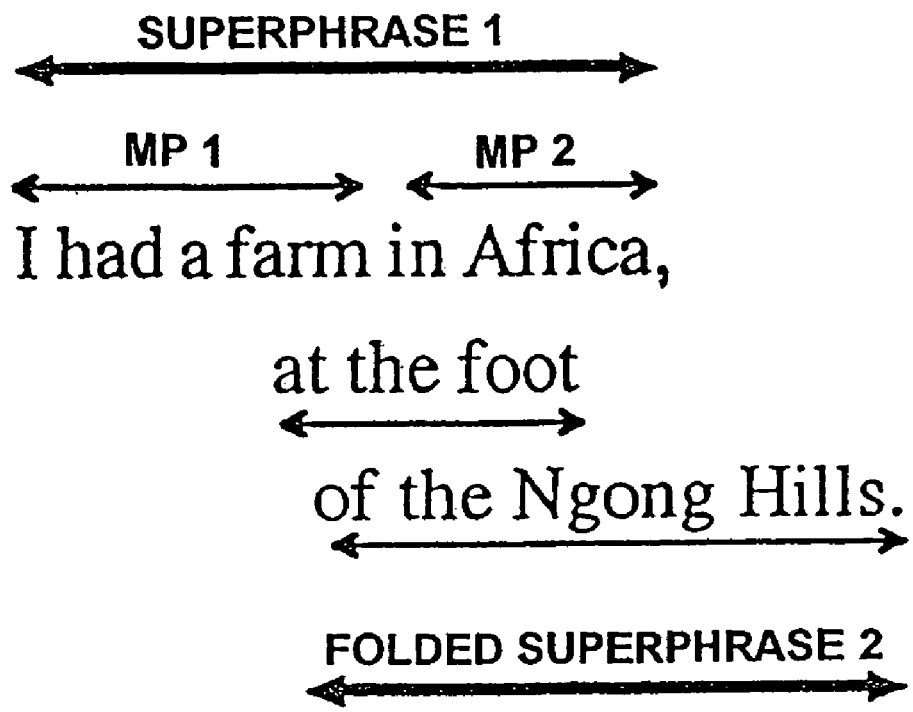
FIG. 9 illustrates the sentence of FIG. 7 presented as enhanced text.

In the example of FIG. 9, Super-phrase 1, "I had a farm in Africa" is divided from Super-phrase 2, "at the foot of the Ngong Hills.", by the primary folding point after the comma. Super-phrase 2 is divided into two Mini-phrases by the secondary folding point before the preposition "of". In the embodiment illustrated in FIG. 9, two miniphrases are presented as the same text segment as the mini-phrase "in Africa", is below the three word minimum length specified by the reader. The first Mini-phrase, "at the foot", in a new line is center justified below the text segment above and right shifted by a right descent angle. The last Mini-phrase of "of the Ngong Hills", is left shifted because of a horizontal displacement rule calling for left shifting when the preceding line terminated with a secondary rather than primary folding point. Thus, in the FIG. 9 example, the total horizontal displacement is determined by a combination of the decent angle and the justification of the line.

Paired punctuation marks including parentheses, braces, brackets, and quotation marks, serve as punctuation marks which determine primary folding point locations in a preferred embodiment. In one embodiment, such paired punctuation is included as an input to the horizontal displacement rules, including horizontal justification and descent angle rules. For example, a long multi-phrase text segment contained within parentheses might have reduced horizontal shifts and reduced vertical displacement, i.e., less line to line spacing than the other text in the active display area of the display surface.

In step 112, the enhanced text is created. In this step, the codes needed to create a properly displayed text segment are created. For example, where the reader specifications require coloring technical words red, and the enriched text indicates a word is a technical word, an escape sequence may be created that will be interpreted by the display step as requiring red text. Similar coding may be required for animation. The enhanced text may be stored at this point for later display.

In step 113, the enhanced text is presented on the display device, one text segment per newly formed line. The enhanced text can also include the animation, background color, text color, tagging, and presentation rates discussed above. In a preferred embodiment, the background color is presented as a function of the sentence and paragraph positions.

In another embodiment, illustrated in FIG. 11, some text is initially presented in one color or brightness for a time period, followed by presentation in a second color or brightness. In FIG. 11, the sentence is presented on three newly formed lines indicated by arrows 200, 202, and 203. Within those lines, the text is presented all on the same line, with the words of FIG. 11 shown on different lines to illustrate the temporal change of initial text color/highlight 206 to text color/highlight 207, and initial text color/highlight 208 to 209. The "Af" text at 206 is the emphasized syllable in "Africa", and is initially shown in color/highlight 206 for this reason. The "gong" text is also the emphasized syllable in "Ngong", and has initial color/highlight 208, followed by color/highlight 209.

The preferred embodiment depicted in FIG. 1 allows the enriched text from step 132 and enhanced text from step 113 to be edited. In a preferred embodiment, a word pointing device such as a mouse is used to select a portion of text to be edited. The enriched sentence corresponding to that portion of enhanced text is internally selected, and the attributes made available for editing. This may be implemented using pull-down menus allowing each attribute of the enriched text and enhanced text to be edited. Where edits to the enriched text could effect presentation, the text is preprocessed according to step 110 again. In the edit session of step 114, reader annotations, either hidden or immediately visible, are accepted and can be stored in the enriched and enhanced sentences. Such annotations perform the same function as hand written notes in a book. The features editable include parts of speech, definition, color, text, folding points, and horizontal displacement.

The edited attributes and display of this embodiment may also be stored, in step 116, preserving the changes. In one embodiment, only the enhanced sentences are stored. In a preferred embodiment, both the enriched and enhanced text are stored. In preferred embodiments, some edits are recorded either as reader specific or global, for presentation to all readers of the text. Manual editing of the enhanced text is especially useful where the same text will be viewed repeatedly by others, as with an electronic book.

In a variation of the embodiment of FIG. 1, steps 113, 114, and 116 are omitted, with no human intervention and no immediate display. In this embodiment, enriched and enhanced text is created and stored for future display. The enhanced text can be stored in standard word processing format such as Microsoft Word (TRADEMARK) or Corel Word Perfect (TRADEMARK) binaries. In this embodiment, the presentation software can be simple, small, and fast relative to the software required to look up words and analyze text. Such a presentation is a preferred embodiment for the mass distribution of enhanced text for reading as "electronic books."

In a related variation of the embodiment of FIG. 1, enhanced text itself is retrieved in step 106, with no preprocessing required and no edits allowed. Such a presentation is also a preferred embodiment for the mass distribution of enhanced text for reading as "electronic books".

Referring to FIG. 1, step 113, the presentation of each screen of enhanced text may be manually triggered as by a mouse click. In a preferred embodiment, the rate of presentation is controlled by reader specified parameters including display time for the text, and inter-sentence and inter-paragraph arrival times. In a most preferred embodiment, the Text Content is measured, and the text presentation interval is dependent on this Text Content. In a preferred embodiment, the pronunciation time of the text is used as a measure of Text Content to determine presentation interval. In another embodiment, the phrase weights are used to measure Text Content and to determine presentation interval.

Figure 10:
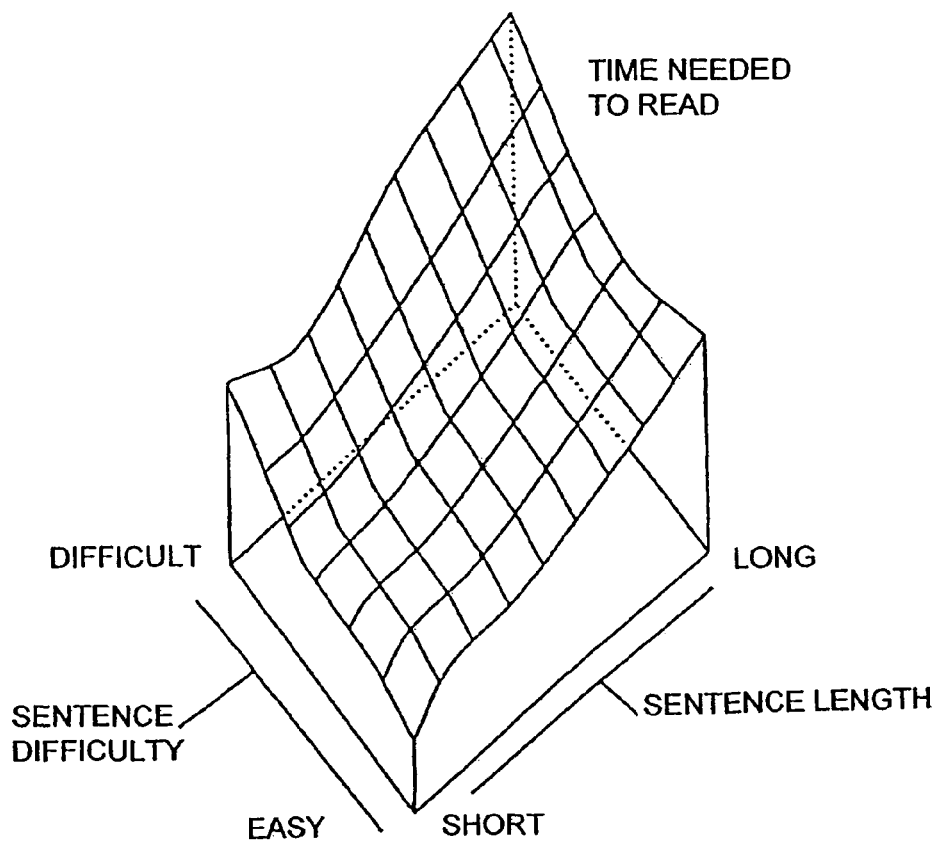
FIG. 10 illustrates a Presentation Interval Sampling History Map, wherein the time needed to read is a function of sentence difficulty and complexity.

A preferred embodiment allows readers to extend the presentation time for a sentence, as well as speed up and slow down the presentation rate. This rate can be recorded, as can the sentence length and sentence difficulty corresponding to a particular presentation interval. FIG. 10 illustrates an example 3-D plot, a "Presentation Interval Sampling History Map", depicting the time needed to read a sentence as a function of two attributes, sentence difficulty and sentence length. The time needed to read can be measured by reader preferences or by previously mentioned eye movement tracking or brain wave activity. The time can then be correlated against two attributes as in FIG. 10, or any number of attributes. The presentation interval in a preferred embodiment is continuously adjusted to match the predicted required reading time.

In yet another embodiment, most appropriate where reading rate is closely measured, the inputs to folding rules are varied and the resulting reading rate tracked. In an embodiment suitable for creating an optimal mass market reading product, inputs to folding rules are varied and reading rates recorded for a sample population. The inputs are varied for optimal reading speed and comprehension. For example, the importance accorded by secondary folding rules to parts of speech relative to phrase weight is varied for optimal reading speed.

In another embodiment, reader manual editing of initial sentence display is analyzed for relative contribution of sentence structure, parts of speech, length, and complexity. After such an initial "tuning" or "training" period, similar weightings are used in folding rules for automatic text enhancement. Subsequent edits may be used to further refine the folding rules.

In step 118, text presentation stops when there is no more text or a reader request to stop. Steps 120 provides for cleanup including final enriched and enhanced text storage, as well as historical storage about the reading session.

Example of Method

Overview of Example Method

The present invention includes a method for text folding and displacement that applicant believes is an improvement over the method previously described under the heading "method" above.

One embodiment of the present invention classifies punctuation marks as either "serial" or "bracketing." Serial punctuation marks include colon, semi-colon, comma, a single double dash ("--"), and the ellipse. Bracketing or nesting punctuation marks include quotation marks, parenthetical marks, brackets (as in [and]), and a pair of double dashes. The present invention works best when bracketed segments do not start inside of one bracketed segment and end within another. This is normally the case.

Segments within bracketing punctuation marks can be serially divided with serial punctuation marks, be further bracketed with inner bracketing punctuation marks, or both. There is one case where two commas in a segment produce a kind of bracketing: the middle segment of the three new segments formed is "bracketed" by the other two segments. This is common and can distinguish a relative clause from a non-restrictive one. It is also the way "for instance" and other such phrases are imbedded in larger phrases. Some bracketed text e.g. text within quotation marks, can span more than one sentence.

In the method described below, bracketed segments are identified. The text outside of the bracketed segment is examined for serial punctuation marks. These are used for folding first. Then non-bracketed text and bracketed text are separated with folding steps that put each type of text on separate rows. Bracketed text is placed on its own row, with the bracketing punctuation marks at the very beginning and end of each segment. This cycle is repeated as needed. A segment is ready to leave the algorithm portion dealing with "punctuation mark folding" and begin with "word-only folding" (word based folding), when it contains no punctuation marks other than those found at the beginning and end. Steps 1 through 15 in the algorithm below deal with punctuation mark folding.

Word-only folding begins with step 16 and will fold each segment to fit between maximum and minimum targets. Folding points in the text will be specified by "hinge words." The hinge words can be specified by a word list. In a preferred embodiment, words or phrases in the word list are associated with a classification code or code word that includes information about the word. In the example illustrated below, the classification include a letter prefix and a number rank or level number. Letter prefixes include "b" (fold before this word, not after), "a" (reserved for future use, fold after this word), "x" (definitive subjective pronoun list), "y" (pre-determiner list), "z" (post-determiner list). Examples of words and associated codes are contained in Appendix 1.

In the example below, the level numbers range from 0 to 99. The lower level numbers have higher rank and are handled first by the algorithm. The variable "n" is used to denote this value in the steps described below. The 10-39 range includes the before "b" hinge words. The 40-46 range includes verbs, including 40 (modal), 41 (have, auxiliary verbs), 42 ("to be" verbs), 43 (unambiguously transitive verbs), 44 (unambiguously intransitive verbs), 45 (ambiguous transitive verbs, words not always verbs), and 46 (ambiguous intransitive verbs, words not always verbs).

Letter prefixes relating to verbs include "c" (infinitive), "d" (past participle), "e" (other forms that do not take helping verbs), "f" (can be both infinitive and past participle), and "g" (gerund). The verb classification is used in an improved verb handling method described in another section.

"Lane" refers to a unit of horizontal displacement that is subdivided into a sub-unit of horizontal displacement called a "Slot." In a preferred embodiment, each lane is 4 spaces wide, subdivided into 4 slots each 1 space across. The lanes are numbered 1 through 5 and the slots labelled A, B, C, and D. In a preferred embodiment, Lane 1, slot A, begins 2 spaces from the left margin, followed by slot B, then C, then D, followed by lane 2, slot A, etc.

"X" (upper case X) denotes the generation number i.e. the recursion level in the algorithm. For example a sentence is divided into a segment 1 and a segment 2, segment 2 is further divided into segments 2.1 and 2.2, and segment 2.1 is further divided into segments 2.1.1 and 2.1.2. Segments 2.1.1 and 2.1.1 are at generation 3. X is often used to determine the coarse horizontal displacement i.e. the lane number.

The "x" (lower case x) denotes the index or offset into the sentence or sentence fragment at a particular word. The x is incremented/decremented in words, not characters.

The "n" term refers to the hinge word level number. In the example below, the hinge word level ranges from 1 through 99.

Referring now to FIG. 12, a table 320 includes a header row 322 listing the spaces from left margin for each column below. A header column 324 contains a list of hinge word levels. The rows are divided into a series of lanes 328 which are subdivided into 4 slots each. A series of Xs, for example at 330, denote the location of the start of a text segment, given the hinge word level and lane.

The Xs in the table shows the slot and lane into which a segment's first character will be placed as a function of the hinge word used to make the fold that produced the segment. Each hinge word level, e.g., b10, b20, can be placed in any of the Lanes from Lane 2 on up. The lane used is determined by which generation of the sentence folding did the fold for the segment occur in. Then, within that lane (e.g., lane 3 for a third-generation fold), a slot is determined by the hinge-word level, as shown in the table. In this way, a third-generation fold made with a b20 level word will be placed in Lane 3 slot B, and a third-generation fold made with a b70 word will be placed in Lane 3 slot D.

The levels shown in the table at level b85 will have folding occur BOTH before AND after the word—in effect placing the word by itself on a its own line. The instructions on the table state where the b85 word should be placed, and where the segment following the b85 word should be placed. The criteria for a b85 word is not on the Hinge Word list, but instead has been defined as any word exceeding 12 characters. As its position on the Hinge Word table implies, b85 words are only used for folding if there are no alternatives higher on the list in the segment being interrogated for folding. It is otherwise not explicitly described in the algorithm.

Method

The Recursive algorithm is begun by setting X=1. Thus initially, the first lane will be used and the algorithm generation is 1.

Punctuation Folds

1. Other than punctuation marks (pms) that may be present at the very beginning or very end of a sentence/segment, are there any other pm's in the sentence/segment?. Yes—go to step 2. No—go to step 16.
2. Are there bracketing punctuation marks in the sentence/segment? Yes—go to step 3. No—go to step 4.
3. Are there serial punctuation marks "outside of" the bracketed text in this sentence/segment? (* If a sentence begins without a quotation mark, but has the second member of a pair of quotation marks later in the sentence [i.e., the quotation started in a previous sentence and is ending in this one], then the segment from the beginning of the sentence to the space following the second member of the pair is also a "bracketed" segment; a similar rule applies if a sentence contains the first but not the second of quotation mark pair.) Yes—go to step 4. No—go to step 9.
4. Are there colon/semi-colons in the non-bracketed text from step 3? Yes—go to step 5. No—go to step 6.
5. Fold the sentence/segment after each colon/semi-colon and place the text that follows each colon/semi-colon (which may contain bracketed text) onto a new row and indent each new row at position Lane X, Slot A; then go to step 6.
6. Are there commas in the non-bracketed text? Yes—go to step 7. No—go to step 8.
7. Fold the sentence/segment after each comma and place the text that follows each comma (which may contain bracketed text) onto a new row; indent the new row of text that comes after the first comma at Lane X, Slot D; indent the new row of text that comes after the second comma at Lane X, Slot B: indent any additional rows of text that follow odd-numbered commas at Lane X, slot D; indent any additional rows of text that follow even-numbered commas at Lane X, Slot B. Then go to step 15.
8. Are there any single "double dash" (--), or ellipse ( . . . ) punctuation marks in the non-bracketed text? Yes—then fold the sentence/segment immediately before each single "double dash", or ellipse: place each new segment that contains the single "double dash" or ellipse and the text distal to it (which may also contain bracketed text) onto a new row; indent each new row at Lane X, slot C. Then go to step 15.
9. Is there any text between the very beginning of the sentence/segment (which itself may be a bracketing punctuation mark) and the first "intra-sentence/segment" bracketing punctuation mark? Yes—go to step 10. No—then keep the first bracketing punctuation mark at the same position (do not fold or indent at this bracketing punctuation mark; for example a parenthetical mark could lead and conclude a sentence or segment but be followed immediately by a quotation mark-these would then be left together according to this step); and go to step 11.
10. Fold the sentence/segment immediately before the first bracketing punctuation mark (which, per step 9, does have text proximal to it); place this first "intra-sentence/segment" bracketing punctuation mark and all of the text distal to it onto a new row; indent this new row at Lane X, Slot D. Then go to step 11.
11. Is there a matching bracketing punctuation mark in the sentence/segment, (i.e., the second member of the bracketing pair)? Yes—go to step 12. No—then the second member of this bracketing pair of punctuation marks is in a later sentence; go to step 15.
12. Is there any text distal to the second member (as per step 11) of the bracketing pair of punctuation marks? Yes—then go to step 13. No—then the second member of the bracketing pair of punctuation marks is the end of this sentence/segment; go to step 15.
13. Fold the sentence/segment immediately after this second member of the bracketing pair; indent the new row of text at position Lane X, Slot B; then go to step 14.
14. Is there another bracketing punctuation mark in the text distal to the second member of the previous bracketing pair? Yes—go back to step 10 and repeat steps 10-14 for this next bracketed segment distal to (not nested in) the previous one. No—go to step 15.
15. Take each of the new segments formed in steps 1 through 14, add 1 to X, and go back to step 1. Repeat folding and indenting instructions using Lane X+1. Repeat steps 1 through 15 until all segments have punctuation marks located only at the beginning, or end, or both of each segment. In this way all segments are eventually sent to step 16 for "word-only" folds.

Word Only Folds

16. Word-only folds begin with this step. For any value of X at step 1 where the answer is "no" and sends the segment to step 16, use the greater of: 2 or X for a Lane to begin the word-only folds. For example: If a sentence going through the cycle for the first time, (where X=1), had no punctuation marks between its beginning and ending, and the answer to Step 1 was "no"; then begin word-only folds not with X (which equals 1) but with 2 (which is greater), i.e., in Lane 2. However, if two cycles through steps 1-15 were required to obtain a segment ready for word-only folds, then, at the beginning of the third cycle, where X now equals 3, and the answer to step one is "no", so at step 16 word-only folds begin with Lane X=3). This will place word-only folds one lane to the right of the last lane used for punctuation mark folds. After determining which lane a sentence/segment's first generation word-only fold will be made indents in, go to step 17.

17. Does the sentence/segment exceed the Maximum Row Value (e.g., number of words or characters in the segment), or does it extend beyond the available space to the right? No—stop. Yes—go to step 18.
18. Are there words in the segment that can be found in the Hinge Word list at level [n] (e.g., level b10 when n=10)? No—go to 18 A. Yes—go to step 19.
18A. Repeat the question for Hinge Word list level [n+1] (e.g., level b20, then b30, etc.); if there are no words in the segment that can be found at any level in the Hinge Word List, up to n=95, then go to step 29. NB Words labelled 99, with prefixes w, x, y, z are used in the verb loop, but are not directly used as hinge words for folding.
19. Is there more than one word in the segment at Hinge Word level [n]? Yes—use the first word that appears in the sequence of the segment, and go to step 20. No—go to step 21.
20. Does the segment formed with the use of the word in step 19 exceed the Minimum row value? No—then repeat the question using the next word in the sequence of the segment that is in the same Hinge Word level [n]; if none of the words at Hinge Level [n] produce a segment that exceeds the Minimum row value then go back to step 18 and repeat for [n+1]. Yes—go to step 21.
21. Fold the sentence at space designated by the word (before if prefix b, after if prefix a) or after), and place the newly formed segment in one of the slots in Lane X, or Lane 2, whichever is greater. The slot to be used in this lane will be determined by the Hinge Word level (see FIG. 12, described below). Then go to step 22.
22. Does the segment exceed the Maximum Row Value or extend beyond the available space to the right? No—stop. Yes—then go to step 23.
23. Are there are still levels to be checked on the Hinge Word List? Check up to n=95. Words in the word list having code words with n=99 e.g. w99, x99, y99, z99, are used in the verb loop described in a subsequent section but are not directly used as hinge words for folding. Yes—go to step 24. No—go to step 29.
24. Are there words in the segment that can be found in the Hinge Word list at level [n] (e.g., level b10 when n=10)? No—then repeat the question for Hinge Word list level [n+1]. If there are no words in the segment that can be found at any level in the Hinge Word List, then go to step 29. Yes—go to step 25.
25. Is there more than one word in the segment at Hinge Word level [n]? Yes—use the first word that appears in the sequence of the segment, and go to step 26. No—go to step 27
26. Does the segment formed with the use of the word in step 25 exceed the Minimum row value? No—then repeat the question using the next word in the sequence of the segment that is in the same Hinge Word level [n]; if none of the words at Hinge Level [n] produce a segment that exceeds the Minimum row value then go back to step 24 and repeat for [n+1]. Yes—go to step 27.
27. Fold the sentence at space designated by the word (before if prefix b, after if prefix a), and place the newly formed segment in Lane X+1, or Lane 2+1, whichever is greater (i.e., one Lane to the right of the one used for indents in the previous word-only fold generation). Does the segment formed exceed the Maximum Row Value or extend beyond the available space to the right? No—stop. Yes—then go to step 28.
28. Are there are still levels to be checked on the Hinge Word List? Yes—go back to step 23, and perform any possible folds using Lane X+x, or Lane 2+x, indents from the table in FIG. 12. No—go to step 29.
29. "Bend" the segment into two or more newly formed segments so that these newly formed segments are less than Maximum Row Value and the space available to the right, and place these newly formed segments in a center justified position beneath the first segment of the group.

Additional Folding for Verbs

This section describes an additional process for text folding involving verbs in English. The added process fits into the previously described "Improved Folding" algorithm at step 18, as described below. The additional process is not required to practice the invention, but provides additional folding processing for verbs as described below.

It is desirable for a text folding process to avoid breaking a string of related verbs that should remain on one segment; and to have folding occur at verbs when a discrete verb phrase is identified; as such, this does not require that a verb necessarily gets put on the beginning of a new row when identified, identification of an appropriate phrase boundary involving one or more verbs might result in a new row being formed after the verb (in English).

It is also desirable for a text folding process: to avoid separating the word "to" from the infinitive form (and only the infinitive form) of a verb that follows it; to similarly link, if they precede a verb, the words "and" and "or" to verbs identified for folding (all verb forms, not just the infinitive forms); to process specific verb+preposition (or verb+adverb) combinations as a single word so that subsequent folding would avoid separating these prepositions or adverbs from the combination they belong to (e.g., "they broke up the fight" v. "he walked up the hill"); and to similarly process the "not" forms of auxiliary verbs as a single word so that they may be recognized as a single word at positions relative to other verbs (e.g., "could_not go" should be processed in the same way as "could go"). It would also be desirable for the pronoun contractions of auxiliary verbs to be labeled as verbs, (e.g., "you'll", "we've", "you're").

Verbs are complex. They can be auxiliary, modal, or ordinary in function. They may be regular or irregular in conjugation. They may be transitive, intransitive, or either in their ability to take an object. They may be ambiguous in whether they are really verbs and not other parts of speech. They can be combined with specific prepositions or adverbs to mean something different from the verb alone. They have several forms which may or not be combined with auxiliary verbs to create various tenses and which agree with the person and case of the subject.

At the present time, it is not practical to direct cascade formatting using all of these variables in all their combinations. However, it is possible to classify verbs into four major function groups (modal, have, be, and ordinary); to sub-classify the ordinary verbs into unambiguous v. ambiguous and transitive v. strictly intransitive; and, for each of these groups, to identify up to five different forms (infinitive, past participle, gerund, other, and combined infinitive-past participle).

Definitions for Verb Folding Method

The "x" (lower case x) denotes the index or offset into the sentence or sentence fragment at a particular word. The x is incremented/decremented in words, not characters.

The "n" term refers, in the verb loop algorithm, to the word in text position relative to the word being investigated. The "n" variable does not refer to hinge word level as in the previous algorithm

Introduction

For each of these function-form verb categories there are basic operations that will determine if folding should occur at a verb, x, (that was otherwise identified for folding by MIN and MAX criteria). These operations look at the word immediately before (x−1) the verb in question and determine if it belongs to a set of words specifically defined for that function-form group. Based on this, then the potential fold is either skipped, (and the next verb in the segment that is a candidate for folding at that hinge level is considered), or the potential fold is kept open to consideration pending the results of (x+1) operations.

The content of these sets for the (x−1) operation will include: words that would disambiguate a verb-noun into a noun; and words that are appropriate helping verbs for the verb in question.

In a subsequent operation, a potential fold before x will be deferred if x+1 is a verb. The x+1 verb is examined to see if the word before it (namely x) is on its list; if x is not on the list for x+1, then the fold is performed before x+1 rather than before x (because x+1 is a verb belonging to a separate verb phrase). If x is on the list for the x+1 verb, (i.e., x is a helping verb for x+1), then folding is NOT performed at x+1, and the word after x+1, (i.e., x+2), is examined. If the word after x+1 is not a verb, then the original deferred fold to occur before x is now performed.

This process exploits the directionality of the folding process: the existing folding procedure moves the inquiry of each potential verb from first to last in the sentence sequence. If two verbs are adjacent to each other, then the x−1 operation performed for the second verb in the adjacent pair of verbs (an operation which looks at the first verb of the pair to see if it is on a list specific for the form-group of the second verb) will determine if a fold should occur between the first and second verbs.

An x−1 operation is required for each verb, even if it is the first word beyond the MINIMUM ROW VALUE. The reason for this is that it is possible the helping verbs of a verb, x, in question were passed over in previous potential folds because they fell within the MINIMUM ROW VALUE. However, by looking back toward the beginning of the segment, the x−1 operation will detect whether a helping verb for x did indeed precede it (even though x−1 is within the MINIMUM ROW VALUE. In this case, the fold at x is not performed.

Moreover, even if x is followed by another verb in this case (or any case where x−1 is a helping verb for x), this verb following x (at the x+1 position), will not be actively looked for once the (x−1) operation determines that x is preceded by a helping verb for x. Instead, the folding process—which is still being driven by the fact that the segment remains >MAXIMUM ROW VALUE (because the potential fold at x was not made)—will go to the next available verb in the segment; the process will then find the verb that had just been x+1, and analyze it as a new x (called x* here). The x*−1 operation will now look back at the former x and determine whether x*−1 is an appropriate helping verb for x*.

The x−1 operation for level 40 verbs (modal verbs, see below), and the x−1 and x+1 operations for level 45/46 verbs (ambiguous verbs that may be either transitive [45] or strictly intransitive [46]), are slightly different than those used for all of the other verbs. In the case of modal verbs, the algorithm was simplified because only an infinitive form of a modal verb (and there is only one modal verb that comes in infinitive form, i.e., "do") can be preceded by another modal verb (e.g., "could do"). In the case of 45/46 level verbs, the typical x−1 operation is initially performed but is followed by specialized x−1 and x+1 questions. These will attempt to disambiguate x, and will include verb-verb interfaces on either side of x.

An inquiry about a potential fold at a verb x on a lower level (e.g., 40), might end up with a fold being made at the space preceding a higher level verb (e.g., 46) that follows it, if one or more verbs sequentially follow x. Once a fold has been made, then the >MAX question is asked again. If more folding is needed, then the process looks again for lower level verbs first. This filters out the more elementary verb phrases first (e.g., those beginning with a modal verb, such as "I could have bought some milk"); followed by verbs tenses involving helping verbs (e.g., "we have been going there for several years"); followed by unambiguous verbs; then ambiguous verbs. Hopefully, the segments will be so frequently brought down to <Max using the other verb levels, that the steps for ambiguous verbs will not be used very often. By the time level 45/46 verbs are used to initiate an inquiry for folding, the higher level verbs will have all been filtered out. This permits some useful assumptions involving verb-verb interfaces that occur between two different 45/46 verbs.

There are four reference lists that are used in addition to verb-verb comparisons: a definite subjective pronoun list (which will make an immediately subsequent ambiguous verb a definite verb, denoted by x99 in the word list); a pre-determiner list (which will make a subsequent ambiguous verb a definite non-verb, denoted by y99 in the word list); a post-determiner list (which will make a preceding ambiguous verb an appropriate phrase boundary, denoted by z99 in the word list); and a gerund helper verb list (which would prevent folding in front of the gerund verb form), denoted by w99 in the word list.

The above algorithms for Lane and Slot assignments of newly formed segments can still be used. The Lane, X, into which a newly formed segment is put is derived from the progressive folding history of a segments generational "ancestors". The Slot (a,b,c,d) within each Lane, into which a newly formed segment is placed, has, up to now been a function of the hinge word level of the word. Because all of these words in the VERB LOOP are by definition verbs, the Slot assignment would be the same, e.g., Slot b.

However, to try to convey the differences among the verb loop folds, the Slot assignments could be modified. Any fold made in the space before the inquiry verb, x, could be in Slot c. Any fold made in the space before a subsequent verb after x (i.e., x+n), when x was followed by one or more verbs, could be in slot b IF the verb at x+n was unambiguous (43 or 44). Any other folds in spaces after x could be in slot d.

Process Overview

A lexicon of verbs is built. While this can be done manually, the rules presented here make it possible to automate this with an electronic dictionary. Each verb is labeled according to its function and form.

In the current hinge word list terminology, verbs would be at a "40s level". The four function groups will therefore be:

modal=40; have verbs=41; be verbs=42; and ordinary verbs=43/44 and 45/46. Groups 43/44 are unambiguous verbs i.e. they are always verbs. Groups 45/46 are ambiguous verbs i.e. they are not certain to be verbs. The odd number in each of these pairs represents transitive verbs; the even number represents strictly intransitive verbs. The verbs at either a 43 or 44 level will be looked for simultaneously in the search for a new candidate verb for folding; once a verb at either 43 or 44 is found, the x−1 operations are different for 43 versus 44. Similarly, the 45 and 46 level verbs will be initially looked for simultaneously, but handled differently once identified for potential folding.

"Open" verbs, namely those not preceded by a verb, will be identified for potential folding as a function of the number of the function group, as is done for the other hinge words on the hinge word list. A string of sequential verbs (or potential verbs) could have several function word levels in it: "He should_not (40) have (41) been (42) bringing (43) work (43) home." The steps outlined later will allow the (x−1) then (x+1) operations to continue through the string independent of the hinge levels of the words in the string.

A preferred method includes five different kinds of verb prefix classifications, based on the form of each verb. I have therefore called each of these five groups: c (for infinitive form, e.g., "to walk", but also "I walk", etc.); d (for past participle form, e.g., walked); e (for other forms that do not take any helping verb, including: those modal verbs which have only this form, the third person singular form of regular verbs, e.g., "he walks", but also "he goes"); f (for forms that are both infinitive and past participle, as in some irregular verbs such as "to cut" and "have cut"); and, g (for gerund form, e.g., walking).

Examples of how specific verbs would be labeled with this classification are included below. Further examples are contained in Appendix 1.

Do c 40, Did e 40, Does e 40, Could e 40,
Might e 40, Have c 41, Had d 41, Having g 41,
Has e 41, Be c 42, Been d 42, Being g 42, Am e 42,
Is e 42, Were e 42,
Walk c 45, Walked d 45, Walking g 45, Walks e 45,
Cut f 45, Cuts e 45, Done d 45, Doing g 45,
Bring c 43, Brought d 45, Bringing g 45, Go c 45,
Gone d 45, Going g 46, Goes e 44, Went e 44.

Integration with Example Method Above

The following steps 18 and 18A replace step 18 and 18A in the above algorithm in embodiments using the verb loop algorithm:

18. Are there words in the segment that can be found in the Hinge Word list at level [n] (b10 through b39, and b50 through b99)? No—go to 18 A. Yes—go to step 19.

Step 18A. Repeat the question for Hinge Word list level [n+1]. IF there are no more hinge words at level b39, then before going to level b50, go to the verb loop for algorithms involving level 40-49. After completing the verb loop for level 40-49, then resume folding beginning with level b50 at step 18. If there are no words in the segment that can be found at any level in the Hinge Word List, then go to step 29.

Verb Loop

Q1. Are there any words in the segment labeled 40 through 46 (with any letter c, d, e, f, or g before them)?
No—go back to step 18 in the usual algorithm.
Yes—go to step Q2.
Q2. Is there a verb labeled 40 in the segment (or remaining segment)?
No—go to step Q20.
Yes—go to step Q3.
Q3. For the first (or next) 40 level verb (x) in the segment, is x beyond the MINIMUM ROW VALUE (>MIN)?
No—go back to step Q2 and inspect for the next 40 level verb in the segment distal to x.
Yes—go to Q4.
Q4. Is the verb x a "c" form (i.e., is it labeled c40)?
No—go to step Q6.
Yes—go to step Q5.
Q5. Is the word preceding x, (x−1), a 40 level verb?
No—go to step Q6.
Yes—Then DO NOT fold at the space before x. Instead, go back to step Q2 and inspect for the next 40 level verb in the segment distal to x.
Q6. There will POSSIBLY be a fold at the space before x, but there may instead be a fold before another verb at x+n. Check the word(s) following x, (x+n), starting with n=1. Is x+n a verb (i.e., any word labeled 40, 41, 42, 43, 44, 45, or 46, with any of the following letters before the number: c, d, e, f, g)?
No—go to step Q6A.
Yes—go to step Q7. Q6A. Is x a "c" form or an "f" form?
No—then fold at the space before x. If the word "and" or the word "or" is the word before x then do not fold before x. Instead, if the "and" word or the "or" word are greater than the Minimum Row value, (>MIN), then fold before the word "and" or the word "or". If the word "and" or the word "or" preceding x is less than the Minimum Row Value (<MIN), then do not fold—instead go back to step 2 and check for verbs in the segment distal to x.
Place the new segment in LANE X (relative to the other prior generations of folding from the original segment/sentence), SLOT A. Then go to step Q19.
Yes—then go to step Q6B.
Q6B. Is x−1 the word "to"?
No—then fold at the space before x. If the word "and" or the word "or" is the word before x then do not fold before x. Instead, if the "and" word or the "or" word are greater than the Minimum Row value, (>MIN), then fold before the word "and" or the word "or". If the word "and" or the word "or" preceding x is less than the Minimum Row Value (<MIN), then do not fold—instead go back to step 2 and check for verbs in the segment distal to x.
Place the new segment in LANE X (relative to the other prior generations of folding from the original segment/sentence), SLOT C. Then go to step Q19.
Yes—then fold at the space before "to". If the word immediately before "to", is "and" or "or", then fold before "and" or "or" instead of before "to". If the "and" word or the "or" word and the word "to" are all greater than the Minimum Row value, (>MIN), then fold before the word "and" or the word "or" or the word "to", whichever is first. If the word "and" or the word "or" or the word "to" preceding x is less than the Minimum Row Value (<MIN), then do not fold—instead go back to step 2 and check for verbs in the segment distal to x.
Place the new segment in LANE X (relative to the other prior generations of folding from the original segment/sentence), SLOT C. Then go to step Q19.
Q7. Is x+n an "e" form?
No—go to step Q7A.
Yes—go to step Q17.

Q7A. Is x+n a "c" form?
No—go to step Q9.
Yes—go to step Q8.
Q8. Is (x+n)−1 a 40 level verb?
No—go to step Q17.
Yes—go to step Q18.
Q9. Is x+n an "f" form?
No—go to step Q11.
Yes—go to step Q10.
Q10. Is (x+n)−1 either a 40, 41, or a 42 level verb? (Note, it is assumed that it will be very rare that such irregular verbs whose infinitive and past participle forms are the same, (i.e., "f" forms), would also be strictly intransitive, AND that a writer would precede the past participle of such a verb with a "be" verb).
No—go to step Q17.
Yes—go to step Q18.
Q11. Is x+n any one of the following: d41, d42, d43 or d45?
No—go to step Q13.
Yes—go to step Q12.
Q12. Is (x+n)−1 either a 41 or a 42 level verb?
No—go to step Q17.
Yes—go to step Q18.
Q13. Is x+n either of: d44 or d46?
No—go to step Q15.
Yes—go to step Q14.
Q14. Is (x+n)−1 a 41 level verb?
No—go to step Q17.
Yes—go to step Q18.
Q15. Is x+n a "g" form?
No—go to step Q17
Yes—go to step Q16.
Q16. Is (x+n)−1 a 42 level verb OR a GERUND HELPER VERB (w99)?
No—go to step Q17.
Yes—go to step Q18.
Q17. ["yes" to Q7 or "no" to Q8, 10, 12, 14, 15, 16] Then FOLD but NOT at the space before x. Instead, fold at the space BEFORE x+n. Place the new segment in LANE X (relative to the other prior generations of folding from the original segment/sentence), SLOT B. Then go to step Q19.
Q18. ["Yes" to Q8, 10, 12, 14, 16]. Then add 1 to n and go back to step Q6 using n+1 instead of n. (That is, inspect the next word that comes after x+1 and see if it is a verb or not, and proceed accordingly.)
Q19. Are there still segments that exceed the MAXIMUM ROW VALUE (or the space available to the right)?
No—stop.
Yes—go back to step Q2.
Q20. Is there a 41 level verb in the segment (or remaining segment)?
No—go to step Q34.
Yes—go to step Q21.
Q21. For the first (next) 41 level verb, (x), in the segment, is x beyond the MINIMUM ROW VALUE (>MIN)?
No—go back to step Q20 and check the segment for a 41 level verb distal to x.
Yes—go to step Q22.
Q22. Is x an "e" form?
No—go to step Q22A.
Yes—go to step Q33.
Q22A. Is x a "c" form?
No—go to step Q24.
Yes—go to step Q23.
Q23. Is (x−1) a 40 level verb?
No—go to step Q33.
Yes—go to step Q32.
Q24. Is x an "f" form?
No—go to step Q26.
Yes—go to step Q25.
Q25. Is (x−1) a 40, 41, or a 42 level verb?
No—go to step Q33.
Yes—go to step Q32.
Q26. Is x any one of the following: d41, d42, d43 or d45?
No—go to step Q28.
Yes—go to step Q27.
Q27. Is (x−1) a 41 or 42 level verb?
No—go to step Q33.
Yes—go to step Q32.
Q28. Is x either one of: d44 or d46?
No—go to step Q30.
Yes—go to step Q29.
Q29. Is (x−1) a 41 level verb?
No—go to step Q33.
Yes—go to step Q32.
Q30. Is x a "g" form?
No—go to step Q32.
Yes—go to step Q31.
Q31. Is (x−1) a 42 level verb OR a GERUND HELPER VERB (w99)?
No—go to step Q33.
Yes—go to step Q32.
Q32. ["Yes" to Q23, 25, 27, 29, or 31] Go to Q32A.
Q32A. Is x a 45 or 46 level verb?
No—then do NOT fold at the space before x. Instead, go back to step Q20 and check for another verb in the segment distal to x. (If there are no more 41 level verbs in the segment, step Q20 directs inquiry to step Q34 for 42 level verbs. Similarly, inquiry is directed from step Q34 to step Q36 for 43/44 level verbs, and from step Q36 to step Q38 for 45/46 level verbs).
Yes—go to step Q40.
Q33. ["yes to Q22 of "No" to Q23, 25, 27, 29, 30, or 31] Go to Q33A.
Q33A. Is x a 45 or 46 level verb?
No—then POSSIBLY fold at the space before x, but check (x+n) first. Go back to step Q6.
Yes—go to step Q42.
Q34. Are there any 42 level verbs in the segment (or remaining segment)?
No—go to step Q36.
Yes—go to step Q35.
Q35. For the first (next) 42 level verb, x, in the segment, is x beyond the MINIMUM ROW VALUE (>MIN)?
No—go back to step Q34 and check for the next 42 level verb in the segment distal to x.
Yes—go to step Q22.
Q36. Are there any 43 level verbs OR any 44 level verbs in the segment (or the remaining segment)? [Note: verbs at either level 43 or 44 are looked for at this step]?
No—go to step Q38.
Yes—go to step Q37.
Q37. For the first (next) 43/44 level verb, x, in the segment, is x beyond the MINIMUM ROW VALUE (>MIN)?
No—go back to step Q36 and check for the next 43/44 level verb in the segment distal to x.
Yes—go to step Q22.
Q38. Are there any 45 level verbs OR any 4.6 level verbs in the segment (or the remaining segment)? [Note: verbs at either level 45 or 46 are looked for at this step]?
No—GO BACK TO THE USUAL ALGORITHMS AT STEP 18 and resume inquiry using hinge word level b50.
Yes—go to step Q39.

Q39. For the first (next) 45/46 level verb, x, in the segment, is x beyond the MINIMUM ROW VALUE (>MIN)?
No—go back to step Q38 and check for the next 45/46 level verb in the segment distal to x.
Yes—go to step Q22.
Q40. ["Yes" from step Q32A]. Is x a 45 level verb?
No—[x is therefore a 46 level verb]. Fold at the space AFTER x. Then go to step Q19
Yes—go to step Q41.
Q41. [x is a 45 level verb]. Is (x+1) a verb? [Note: by now, if (x+1) is indeed a verb, then (x+1) should be either a 45 or 46 level verb]
No—then do NOT fold at the space before x. Instead, go back to step Q38 and check for the next 45/46 level verb in the segment distal to x.
Yes—then DO NOT FOLD at the space before x. INSTEAD, FOLD at the space before (x+1), (which is also the space AFTER x).
Place the newly formed segment in LANE X (relative to the other prior generations of folding from the original segment/sentence), SLOT D. Then go to step Q19.
Q42. ["Yes" from step Q33A] Is (x+1) a verb?
No—go to step Q43.
Yes—then fold at the space before (x+1), which is also the space after x. Place the new segment in LANE X (relative to the other prior generations of folding from the original segment/sentence), SLOT D. Then go to step Q19.
Q43. Is x a "c" form or an "f" form?
No—go to step Q45.
Yes—go to step Q44.
Q44. Is (x−1) the word "to"?
No—go to step Q45.
Yes—then fold at the space before "to". If the word immediately before "to", is "and" or "or", then fold before "and" or "or" instead of before "to".
If the "and" word or the "or" word and the word "to" are all greater than the Minimum Row value, (>MIN), then fold before the word "and" or the word "or" or the word "to", whichever is first. If the word "and" or the word "or" or the word "to" preceding x is less than the Minimum Row value (<MIN), then do not fold—instead go back to step 38 and check for 45/46 level verbs in the segment distal to x.
Place the new segment in LANE X (relative to the other prior generations of folding from the original segment/sentence), SLOT C. Then go to step Q19.
Q45. Is (x−1) a word on the DEFINITE SUBJECTIVE PRONOUN LIST [list x99; these words are I, we, he, she, they, who, etc.]?
No—go to step Q46.
Yes—then fold at the space AFTER x. Place the new segment in LANE X (relative to the other prior generations of folding from the original segment/sentence), SLOT D. Then go to step Q19.
Q46. Is (x−1) a word in the PRE-DETERMINER SET [y99]?
No—go to Q46A.
Yes—then do NOT fold at the space before x and go back to step Q38 to check for 45/46 level verbs in the segment distal to x.
Q46A. Is x an "f", "d" or "g" form?
No—go to step Q47.
Yes—then fold at the space before x. If the word "and" or the word "or" is the word before x, (x−1), then do not fold before x. Instead, if the "and" word or the "or" word are greater than the Minimum Row value, (>MIN), then fold before the word "and" or the word "or". If the word "and" or the word "or" preceding x is less than the Minimum Row Value (<MIN), then do not fold—instead go back to step 38 and check for 45/46 level verbs in the segment distal to x.
Q47. Is x a 45 level verb?
No—then do NOT fold at the space before x and go back to step Q38 to check for 45/46 level verbs in the segment distal to x.
Yes—go to step Q48.
Q48. Is (x+1) a word in the POST-DETERMINER SET [z99]?
No—then do NOT fold at the space before x and go back to step Q38 to check for 45/46 level verbs in the segment distal to x.
Yes—then FOLD at the space BEFORE x. (If the word "and" or the word "or" is the word before x then do not fold before x. Instead, if the "and" word or the "or" word are greater than the Minimum Row value, (>MIN), then fold before the word "and" or the word "or". If the word "and" or the word "or" preceding x is less than the Minimum Row Value (<MIN), then do not fold—instead go back to step 38 and check for 45/46 level verbs in the segment distal to x.)
Place the new segment in LANE X (relative to the other prior generations of folding from the original segment/sentence), SLOT C. Then go to step Q19.

(End of Verb Loop).

Additional Aspects of the Invention

Text Enhancement Using Reader-Performer Actions

Text presentation can be enhanced using actions of a reader or reader-performer as inputs and a variety of audio-visual effects as outputs. In one embodiment, a reader or reader-performer reads text aloud while varying pitch, tone, volume, and pauses for effect. The term "reader-performer" is used to distinguish over the reader of the enhanced text and to note that reading aloud can include many actions in addition to speech. The spoken text is recorded for use in displaying the text. In one embodiment, the spoken text is recorded electronically and analyzed for spoken action attributes such as pitch, tone, volume, and pauses. In a preferred embodiment, spoken text attributes are analyzed and the analyzed attributes are stored in addition to the spoken text itself. The attributes such as pitch, tone and volume, are stored and mapped to correspond to the text letters, syllables and words which are also stored, such that the attributes can be extracted and reproduced in some fashion in correspondence with the original text. Reader-performer action attributes can be presented as display attributes such as font, intensity, font line thickness, font character height, character color, background color, inter-character spacing, inter-word spacing, interline spacing and inter-sentence spacing.

In one example of the invention, the volume of the reader is reproduced as font intensity and the pitch is reproduced as font thickness, with higher pitches being reproduced as narrower characters and lower pitches being reproduced as wider characters. Font intensity can refer to the number of pixels set per unit area to a different color than the local background pixels. In one example, intense text is black text on white background while less intense text is gray text on white background. In another example of the invention, the character color is varied in accordance with the pitch. For example, higher pitched words are reproduced more toward the red end of the ROYGBIV spectrum while lower pitched words are reproduced more toward the violet end of the ROYGBIV spectrum. In another example, the text is displaced from the normal horizontal base line of the text in accordance with the pitch of the reader-performer. One embodiment displaces text upward for higher than average pitch and downward for lower than average pitch.

In another example of the invention, the reader-performer's spacing and duration of pronunciation of specific words is reproduced in enhanced text with spacing of letters, words and sentences. The reader's word pronunciation time and inter-word and inter-sentence spacing can be recorded, allowing normal inter-word and inter-sentence spacing to be measured. Words pronounced more slowly than normal can be reproduced with additional spaces between letters of the word. Longer than normal inter-word time spaces can be reproduced using longer than normal inter-word distance spaces on the displayed text. Even longer time spaces can be reproduced by displaying the separated words or phrases on new lines. Extremely long time spaces can be displayed as the separated words or phrases on new lines that are vertically separated by a greater distance than normal.

Hand Gestures

In another aspect of the invention, the reader-performer actions recorded during reading include hand and finger gestures. The position and orientation of the hands is preferably recorded and stored to correspond to each word read aloud. Orientation refers to the direction pointed to by the hands, fingers, or palms. In a two dimensional plane, the orientation may be recorded as a two dimensional vector. In a three dimensional model, the hands may be recorded as a three dimensional vector. The positions may be recorded as the position relative to the reader-performer's shoulders or other body reference point.

In selected, appropriate text selections, the vertical and horizontal displacement of text can be varied in accordance with text content. One example of this would be display of the sentences "On one hand . . ." and "On the other hand . . . ." The first phrase could be displaced horizontally to the left while the second, opposing sentence could be displaced horizontally to the right. Similar, vertical displacements could be used to contrast hand actions such as "He promised this, but delivered only this".

Hand position and orientation can be recorded using known technology such as the placement of infrared reflecting dots at strategic locations on the hands. The reflections of projected infrared lights can be captured and stored, allowing later reproduction of hand movement. In another method, the reader-performer uses gloved hands and the hand positions are recorded directly with a digital camera using the contrast of the hands against the darker background.

Facial Expressions

In another aspect of the invention, facial expressions of the reader-performer are recorded during reading and stored in correspondence with the words being read. One embodiment records eye or eyelid shape, eye openness, eyebrow position, head position, jaw position, and mouth shape. The facial expression actions of the reader-performer can be recorded on a per word basis and displayed back on a per line basis. In one embodiment, the extreme positions are used to represent the position for the entire line. In another embodiment, an average position is used to represent the position for the entire line. In another embodiment, the facial expressions are used to vary the presentation of the text itself. In one example, the degree of openness of the mouth is used to vary the degree of openness of certain closed vowels, such as "O". The more the mouth of the reader-performer is open, the larger the O and the opening within it become. In another example, the degree of height of certain letters such as "W" or "T" is varied depending on the degree of openness of the eyelids. The facial expression representation described above is combined with text swiping previously described in one aspect of the invention. In one embodiment, a line drawing of a human face is reproduced above the word being swiped or highlighted. The facial features on the animated face change dynamically. In another embodiment, one face is represented beside each line of text, with the face animated as the line is swiped. In yet another embodiment, a face is presented near a phrase to be enhanced, and a static facial expression shown on the face.

Text Presentation Along a Curved Line

In another aspect of the invention, text is displayed along a curved baseline rather than a conventional horizontal straight line as a function of reader-performer actions. In one embodiment, the curved line is either invisible or substantially less visible than the text displaced. The curve in one embodiment is varied in accordance with some action of the reader-performer. In one example, the horizontal displacement of the curve is greater for higher pitches and less for lower pitches. The word pitch can be obtained from a phonetic dictionary e.g. the pitch of the word can be looked up rather than obtained from a speaker's voice. In another example, the horizontal displacement is varied in accordance with the volume of a reader-performer's voice. In one example, the reader-performer action is sufficiently damped so as to maintain an evenly flowing smoothly curved line.

Text Bending

Introduction

In spoken language, the variability in tone, pitch, and volume from one word to the next creates a signal that can be thought of as a curve or trajectory. From the pronunciation of just a few words of a sentence, the beginning of such a curve is "drawn" on an "aural chalkboard". The listener uses this initial curve to build and anticipate, in the mind, the structure of the phase or sentence as a whole, even before it has been completely uttered by the speaker.

This powerful information makes speaking-listening very efficient. However, current text presentation technology does not readily permit a system that could consistently and meaningfully depict these aural curves in graphical form. Instead, the reader must resuscitate the elocutionary force of the sentence by decoding the symbols of the text and recreating an aural representation of the sentence as a whole in the mind.

Within a sentence, segments can be identified using content analysis that would have characteristic prosodic contours. The present invention describes a method to create graphical correlates of these contours of sentence segments, and to integrate these graphical sub-units into a larger structure to depict the sentence as a whole.

The Process

1. Sentence segments are identified using the "sentence folding" algorithms previously described.

2. Instead of horizontal displacement rules, a set of curves is defined and each sentence segment is assigned to one of these curves.

3. The curves are then arranged on the reading field in a pattern that unambiguously depicts the sequence of the segments (e.g., from top down); the position of segments within these arrangements can be modified slightly, without changing the implied sequence, in order to optimize the perception of the curves and the reading of the sentence.

Figure 13:
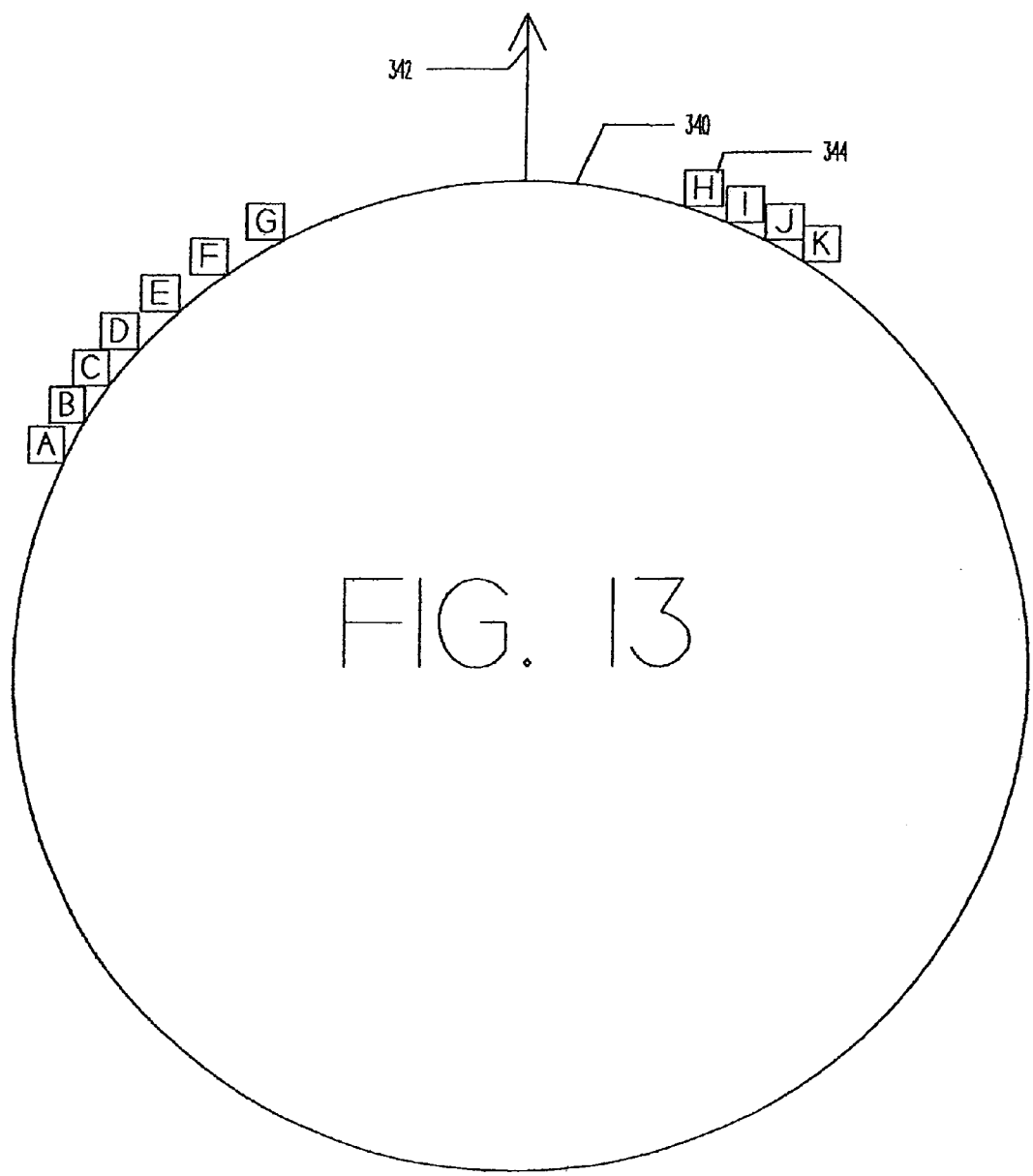
FIG. 13 illustrates a curve suitable for text bending.

A sample of a master curve 340 which defines the size and orientation of segment curves is depicted in FIG. 13. A series of letters, such the letter "H" at 344, lie on curve 340. An arrow 342 at the top of the curve indicates the position with which a sentence segment curve that was drawn from a Head letter (A through G) to a Tail letter (H through K) would be oriented on the reading field and relative to other sentence segment curves.

The Head letter position on the curve is determined by the circumstances of the beginning of the segment. The Tail letter position is determined by the circumstances of the end of the segment. These circumstances are summarized in a table 350 in FIG. 14.

After the Sentence folding algorithms have identified segments of the sentence which will occupy separate rows (in this description, they will occupy separate curves), the length of the segment is measured. A line is drawn that corresponds to this length. The line is then "bent" so that the shape (in degrees and orientation) of the newly formed curved line conforms to the Head-Tail letter positions specified in FIGS. 13 and 14. The "dangle" point, or the position of the arrow at the top of the curve, is also identified.

The size of a segment curve is determined by its length, in characters; however, regardless of its length, the shape and orientation of the segment curve will be determined by the process described above. If a segment is very short, such that the curved segment would be too small and the curve too extreme, a minimum curve would be defined. Short segments with an H tail would then be placed at the Head letter specified by their beginning circumstances-but the remainder of the segment would follow the curvature specified by the minimum curve path and the "dangle point" would also be specified by the minimum curve. Similarly, short segments with an I, J or K tail would be placed at the Tail letter specified by their ending circumstances, and the remainder of the segment would follow the curvature specified by the minimum curve path and its "dangle point".

Parameters for maximum line length would likely prevent segments from being so long, i.e., have so many characters, that their curves would be very large and relatively flat.

Figure 16:
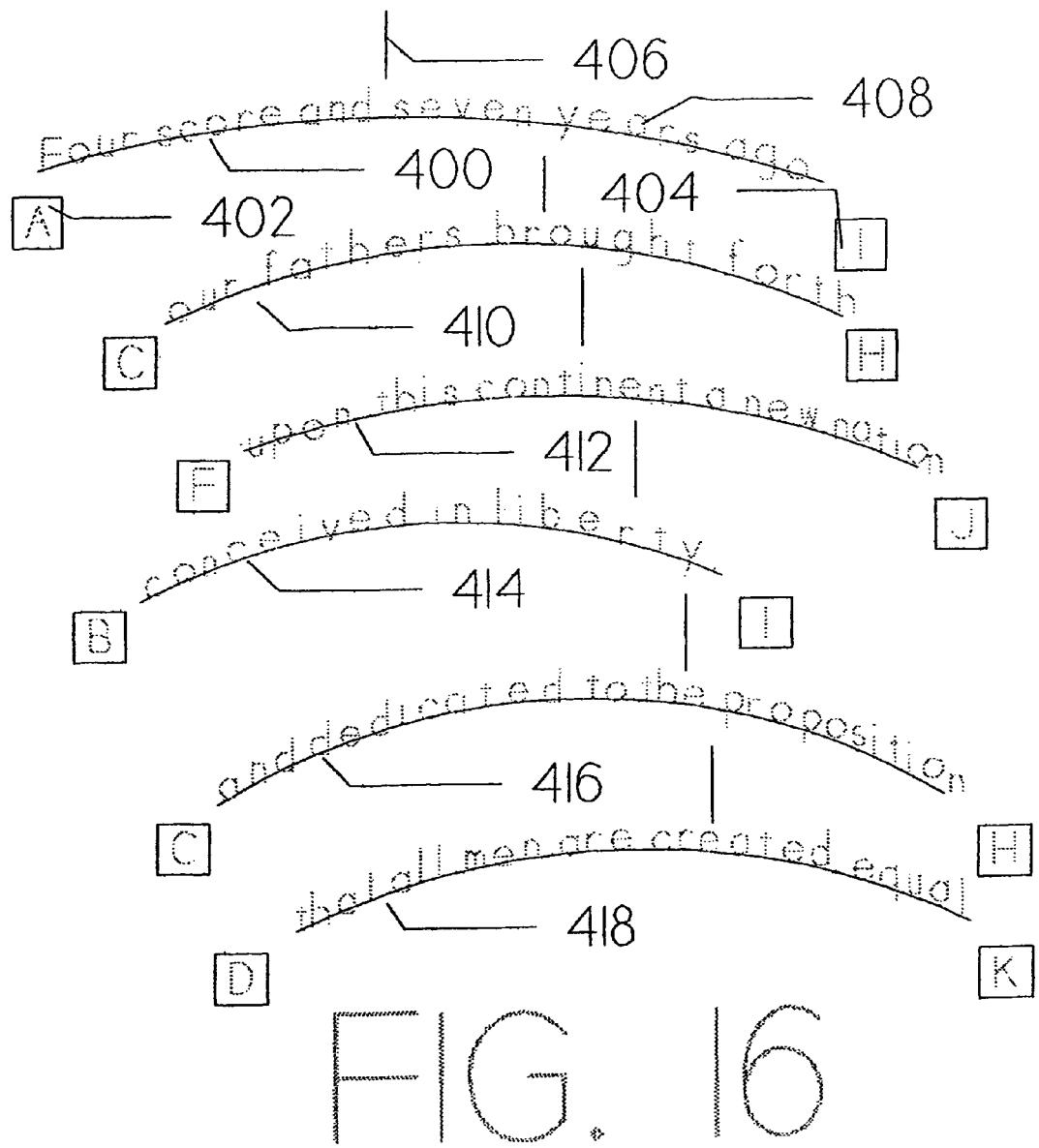
FIG. 16 illustrates several bent text segments formed over curves in accordance with FIG. 14 and FIG. 15.

The newly formed curves would then be positioned, in this example, with the first segment of the sentence on top. In one embodiment, the location of the dangle point is a function of the next segment could be developed that was a function of the tail of the segment preceding it. After all of the curves are in position, the characters of text for each segment are positioned on the curve and the lines and the dangle point are erased. A sample of this process is shown in FIGS. 15 and 16.

New Qualities Imparted by the Text Bending Process

This text presentation method allows the reader to recognize, by a particular curve in the layout of its characters, an individual segment's structure and function (not just sequential position) in the overall structure of the sentence. This provides graphical information that facilitates cognitive processing of the sentence's segments while reading. This is similar to the way the word-to-word variability in pitch and tone in speech creates an aural curve that helps the listener predict how long a phrase is going to be and whether or not it will be the end of a sentence or clause.

Conventional text only uses punctuation marks, which are often not discovered until the reader has already read the entire phrase-this prevents the reader from making, in the mind, a corresponding phonological model of what was read until after the entire segment is read. The curves created by my process allow this type of phrase structure and function information to be known in advance, so that this information can be used in word recognition and phrase comprehension. These curves are also defined by content (i.e., hinge words) other than punctuation marks. They also further differentiate segments created in the sentence folding process, by depicting circumstances of both the head and tail of a segment.

Referring now to FIG. 15, a sentence 380, the first sentence of the Gettysburg Address shown in cascade form as generated by algorithms (Step 1 under "the Process" heading above). A column 386 specifies a start letter 382 and an end letter 384, for each line of the sentence. This determines the type of curve to be curve to be assigned to each segment.

An integration of these individual segment curves, from Step 3, is illustrated in FIG. 16. For example, sentence 408 is bent over a curve 400, starting at an end position A, ending at an end position 404, and having a dangle point denoted by 406. Subsequent segments are placed beneath preceding segments by placing the "dangle point" approximately two-thirds the way across the curve above them. Additional content-based rules could optimize these "dangle point' positions. In one embodiment, the lines and Head/Tail letters do not appear, only the characters of the text appear. A series of bent text curves generated by the example in FIG. 15 are illustrated by curves 410, 412, 414, 416, and 418.

The curves enhance the "visual prosody" of the text presentation. Each sentence acquires an even more unique visual appearance. The curves also break up the monotony of linear presented text, which may reduce fatigue of the eye muscles.

Text Hierarchy Display

Another aspect of the present invention provides an improved means for displaying text hierarchies and the location of text being read within those hierarchies. A conventional text hierarchy, listed from higher to lower rank, includes volume number, section, chapter, sub-section, page, paragraph, and sentence. The present invention provides a method for informing the reader of both the number of the units in each hierarchy and the position of the text being read within that hierarchy.

Figure 17:
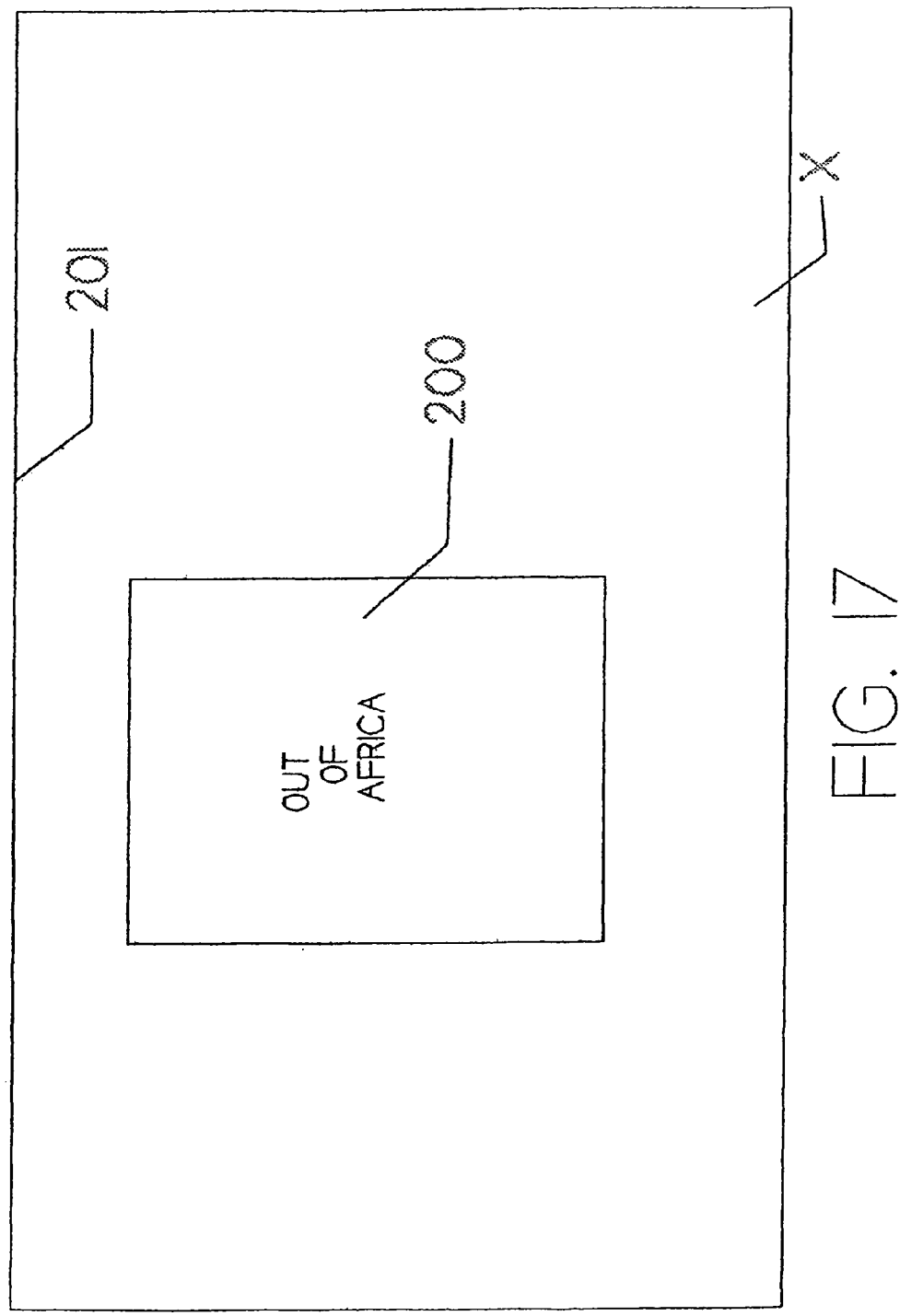
FIG. 17 illustrates a computer display having a book on a computer display prior to opening.
Figure 18:
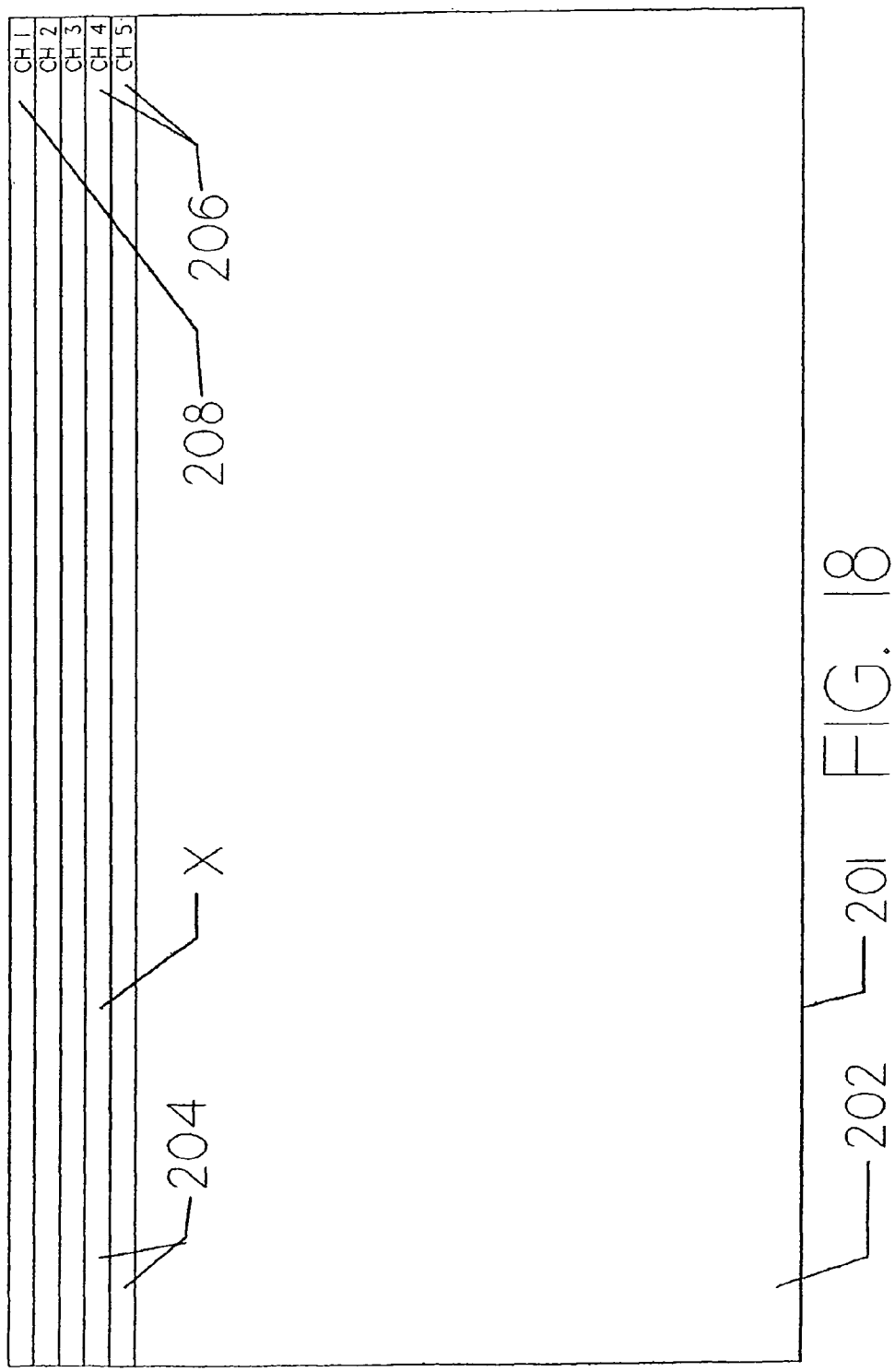
FIG. 18 illustrates a computer display showing the book of FIG. 17 after opening, exposing the chapters within.

Referring to FIG. 17, an unopened book 200 is illustrated. The book is selected for opening by the reader, as indicated at "X." The reader selection can be performed using any method known in the art including cursor movement and selection with a mouse. Referring now to FIG. 18, book 200 has been selected, opened and displayed as a plane 202 filling a substantial portion of a display screen 201. Opening book 200 has revealed a plurality of chapters 206 each having an exposed margin 204. In one embodiment, the chapter margins have the chapter number inscribed thereon as indicated at 208. Reader selection of Chapter 4 is indicated at "X" in FIG. 18, causing the chapters to separate at Chapter 4 as illustrated in FIG. 19.

Figure 19:
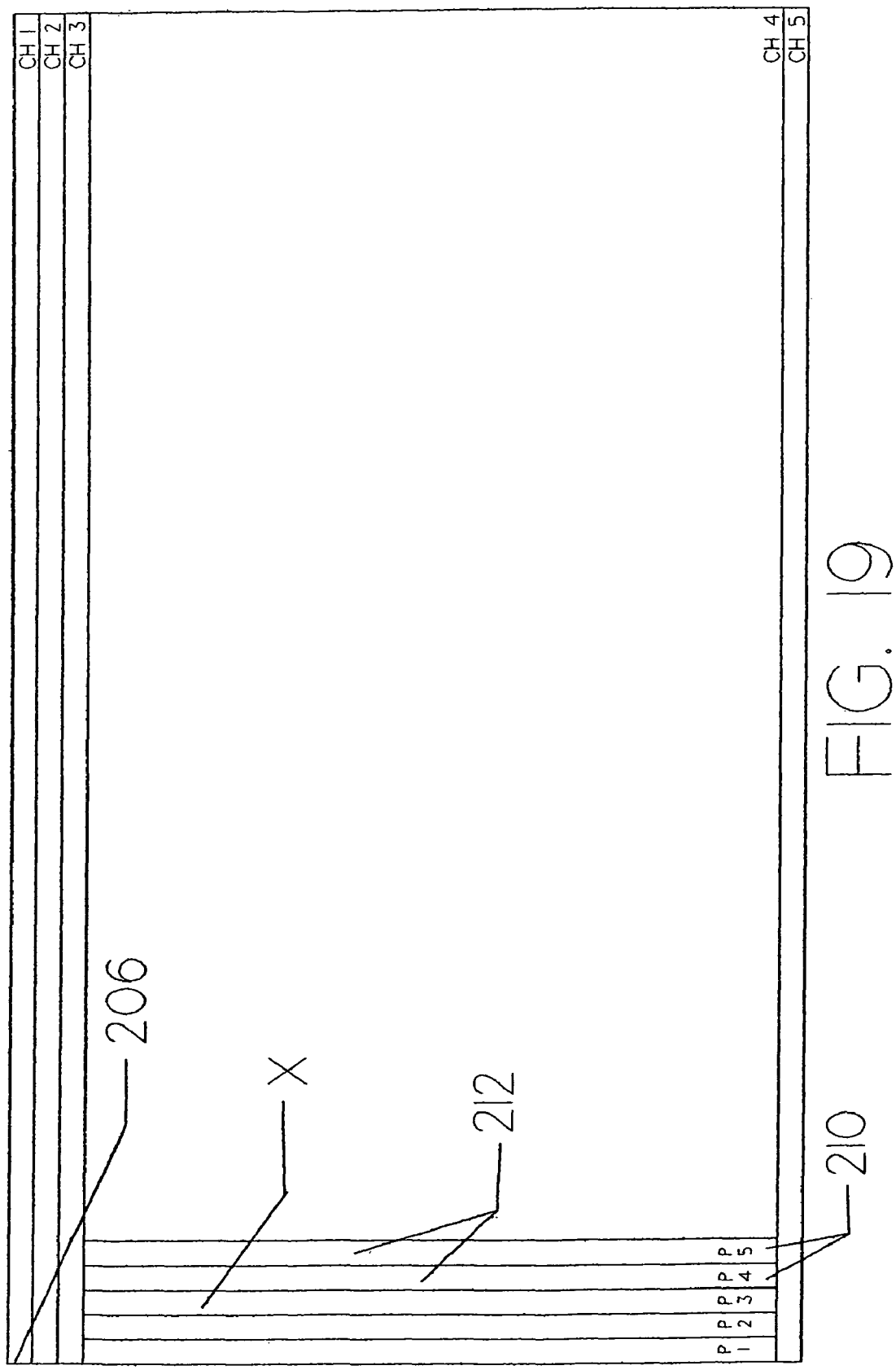
FIG. 19 illustrates a computer display having the chapters of FIG. 18 after selection of a chapter, exposing the pages within.

Referring now to FIG. 19, the result of selecting Chapter 4 is illustrated. Chapters 206 are illustrated having separated to display Chapter 4, exposing pages 210 within the chapter. Pages 210 have vertical margins 212 exposed. In one embodiment of the invention, pages are numbered and arranged to mirror the pages in a print edition of the book. In another embodiment of the invention, pages are numbered to take advantage of the enhanced format of the text presentation, with no attempt made to mirror any print edition of the book. Specifically, the pages can be formatted and numbered to contain only a maximum number of paragraphs or a maximum number of words, whichever is reached first. In this embodiment, paragraphs need not be broken across pages. In this embodiment, the number of paragraphs and words in the maximum are preferably set to values approximating those of a normal published page. In yet another embodiment of the invention, the number of pages in a chapter is set to a maximum, for example 50, with the paragraphs evenly divided into those 50 pages. In this last example, at most only 50 pages are presented on the display screen. Reader selection of page 3 is indicated at "X" in FIG. 19, causing the pages to separate at page 3 as illustrated in FIG. 20.

Figure 19A:
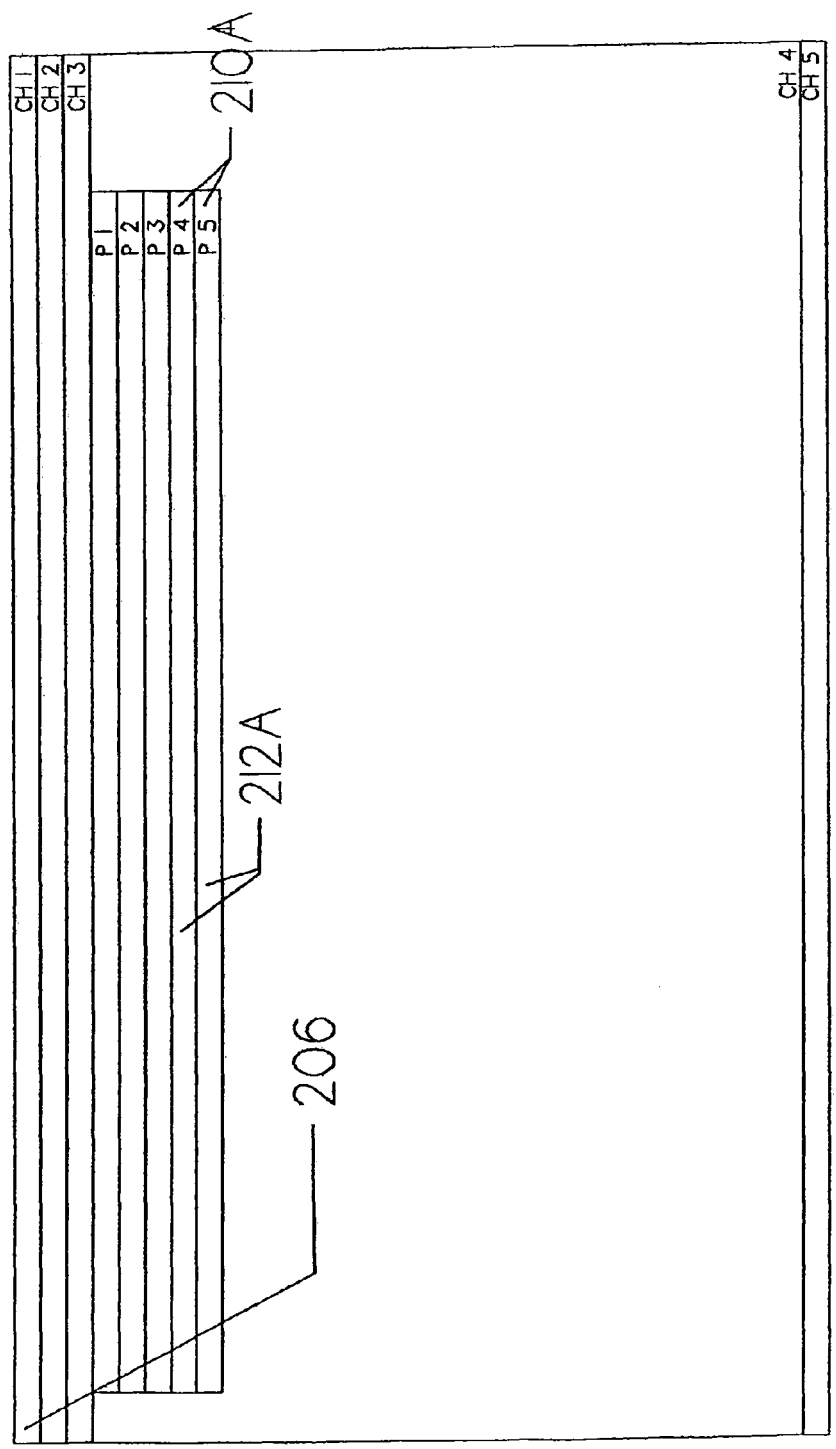
FIG. 19A illustrates an alternate embodiment computer display having the chapters of FIG. 18 after selection of a chapter, exposing the pages within.

Referring now to FIG. 19A, the result of selecting Chapter 4 in FIG. 18 is illustrated in an alternate embodiment. Chapters 206 are illustrated having separated to display Chapter 4, exposing pages 210A within the chapter. Pages 210A have horizontal margins 212A exposed. In this embodiment, the nesting of the text hierarchies is denoted by the margins having a shorter length for lower ranked hierarchies. In the example of FIG. 19A, pages 210A have margins oriented substantially parallel to Chapters 206, but with the margin 212A of pages 210A having a shorter length than the margins of Chapters 206.

Figure 20:
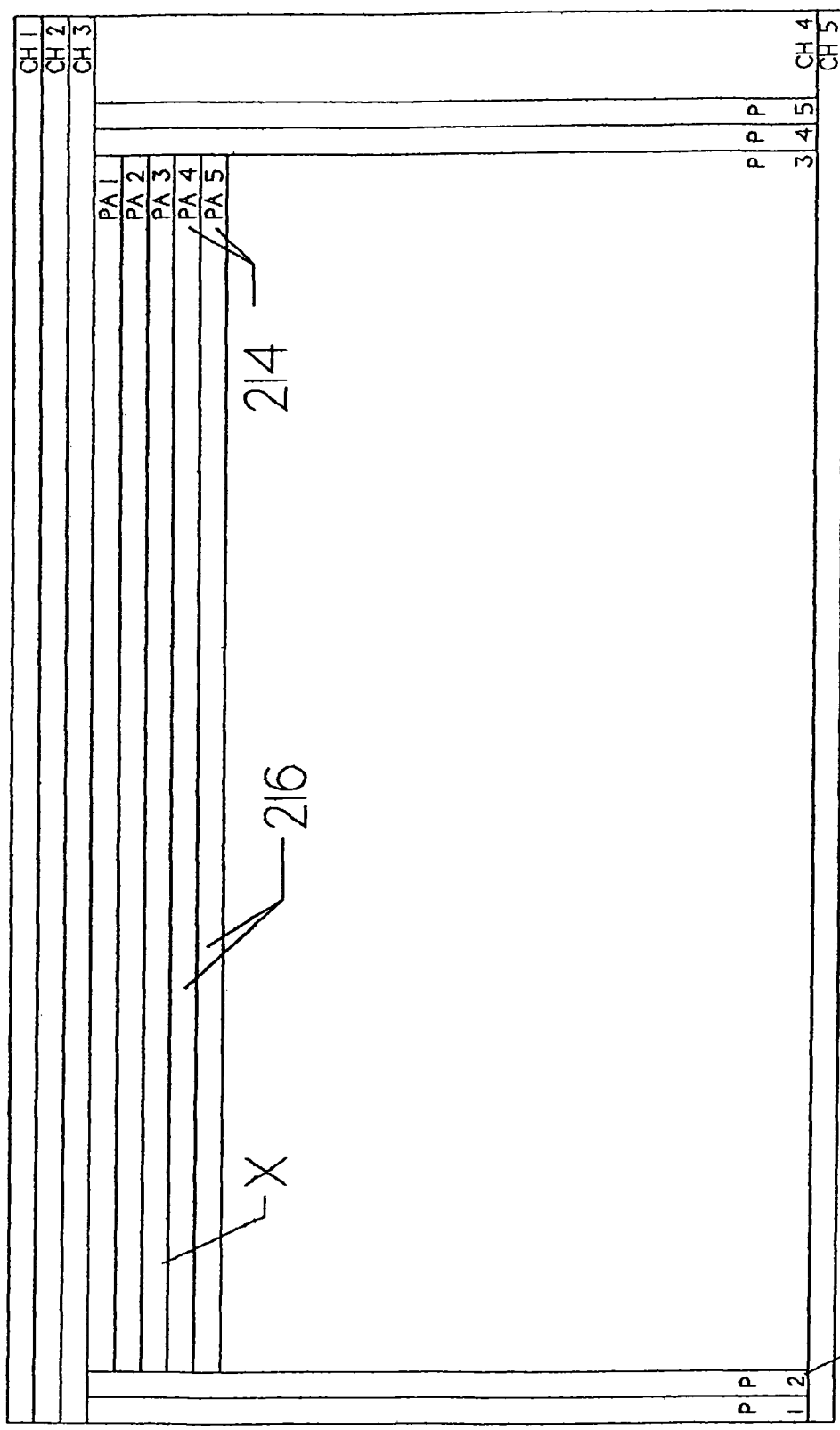
FIG. 20 illustrates a computer display having the pages of FIG. 19 after selection of a page, exposing the paragraphs within.

Referring now to FIG. 20, the result of selecting page 3 is illustrated. Pages 210 have separated at page 3 to display paragraphs 214 within. In the initial display, only paragraph horizontal lower margins 216 are displayed. Reader selection of paragraph 3 is indicated at "X" in FIG. 20, causing the paragraphs to separate at paragraph 3 as illustrated in FIG. 21.

Figure 21:
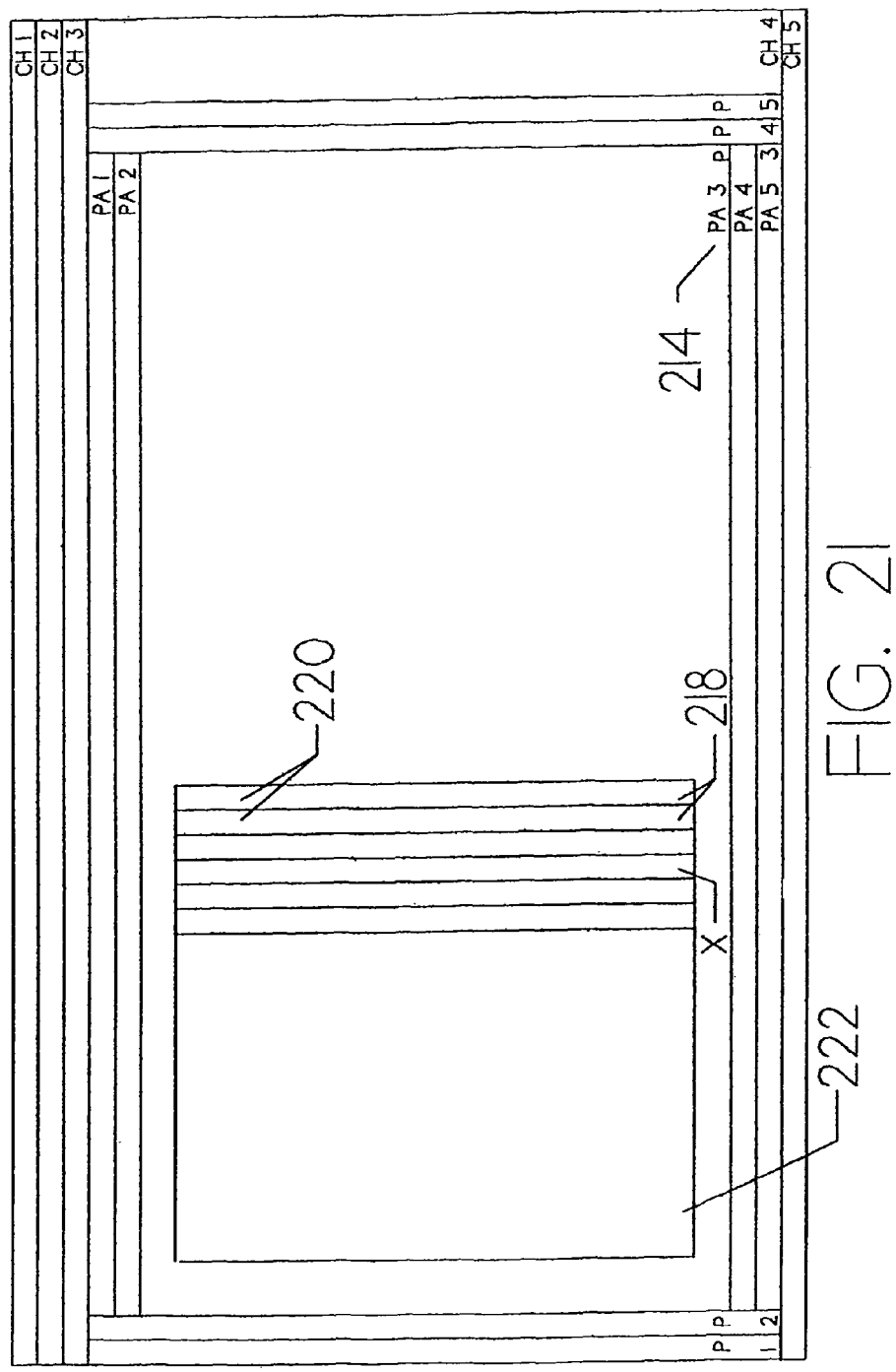
FIG. 21 illustrates a computer display having the paragraphs of FIG. 20 after selection of a sentence, exposing the sentences within.

Referring now to FIG. 21, the result of selecting paragraph 3 is illustrated. Paragraphs 214 have separated at paragraph 3 to reveal sentences 218 having vertical margins 220 within. In one embodiment, the first sentence is initially displayed, ready for reading, as illustrated at first sentence 222. In another embodiment, only margins 220 are initially displayed upon opening the paragraph. Reader selection of sentence 4 is indicated at "X" in FIG. 21, causing the sentences to separate at sentence 4 as illustrated in FIG. 22.

Figure 22:
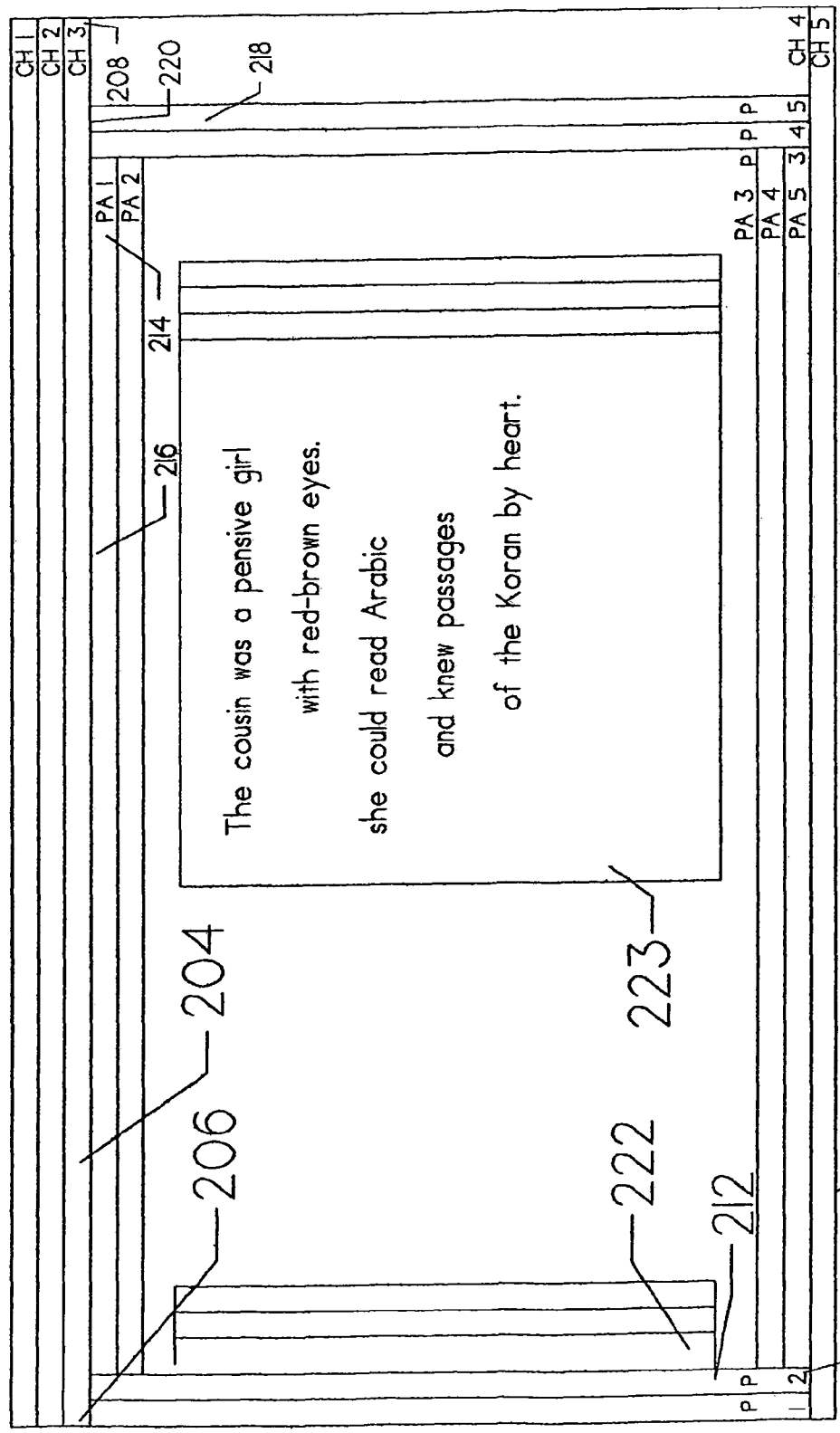
FIG. 22 illustrates a computer display having a cascaded sentence on a page selected in FIG. 21.

Referring now to FIG. 22, the result of selecting sentence 4 at 223 is illustrated. Sentence 4 is the sentence currently being read. In one embodiment, the completion of reading sentence 4 is indicated by the reader activation of a computer peripheral device such as a mouse button. In another embodiment, the completion of reading a sentence is indicated by the passage of a time period calculated to correspond to the weight of the sentence and the reader's recent reading speed. In a preferred embodiment, the completion of sentence reading is switchable between a time based mode and a reader actuated mode. In one embodiment, speed is reader adjustable using input such as a sliding scroll bar. This allows the reader to increase and decrease speed easily to suit the passage being read.

When completion of reading a sentence is indicated, the next sentence is advanced into position. In FIG. 22, in one embodiment, sentence 4 slides quickly to the left to reveal sentence 5 underneath. In another embodiment, sentence 4 and all subsequent sentences in the paragraph slide to the left by the width of one vertical margin, with sentence 4 continuing to slide left to takes its place underneath sentence 3. In this last embodiment, the sentence being read can be maintained in the same position by moving the sentence before the text of the sentence becomes visible to the reader. After the last sentence in the paragraph is read, the next paragraph is opened to reveal the sentences within, resembling closely the illustration of FIG. 21, but with the next paragraph exposed or pulled down.

In a preferred embodiment of the invention, alternate text hierarchies are represented by planes having alternate horizontal and vertical exposed margins. Stated differently using current Microsoft Windows terminology, alternate text hierarchies are represented by alternately horizontally and vertically tiled planes. In one embodiment, the outer, higher ranked text hierarchies appear to be behind the inner, lower ranked text hierarchies, as the opened higher ranked text hierarchies have the next lower ranked text hierarchy displayed thereover. In another embodiment, the outer, higher ranked text hierarchies appear to be closer to the reader, with the inner, lower ranked hierarchies displayed further from the viewer. In this embodiment, the currently opened text hierarchy is preferably not displayed, except for the currently being read sentence. In one example using horizontally tiled text units and having a text unit number 3 opened, the text units appear as a deck of cards splayed open, having 1 on top of 2 on top of the top edge of 3 and 4 under 3 and 5 under 4. The units toward the top of the screen appear closer to the viewer than the units toward the bottom of the screen. This is the arrangement used in the embodiment of FIG. 22 with respect to paragraphs, but with paragraph number 3 opened.

In another example, text units 1 through 3 are as previously described, but text unit 4 is on top of the lower edge of text unit 3, and text unit 5 is on top of all but the upper edge of text unit 4. In this arrangement, the text units appear to grow further away from the viewer from the outer margins until the opened text unit is displayed, after which the text units appear to become closer to the viewer until the opposite outer margin reached. This arrangement is similar to having a series of nested theater curtains, the outer curtains being in front, the more inner curtains being behind the outer curtains, and the more inner curtains revealing a smaller aperture than the outer curtains.

In the general case, the orientation of the margins is varied depending on the text hierarchy level represented. While the illustrated embodiments have the margins oriented alternately horizontal and vertical, 90 degrees offset, in the general case, the offset could be less. In one example, the highest level hierarchy has horizontal margins (extending from 9 O'clock to 3 O' Clock), and the next, lower level is offset by 30 degrees, extending from 10 O'clock to 4 O'clock.

Referring again to FIG. 22, the display of the current "book" being read can be explained without reference to how the reader came to be reading a particular sentence. The next lower text hierarchy is indicated by chapters 206 which are horizontally tiled, having horizontal lower margins 204 exposed. The next lower text hierarchy, pages 210, are displayed superimposed over chapters 206. Pages 210 are vertically tiled, having vertical margins 212 exposed. The next lower text hierarchy, paragraphs 214, are displayed over pages 210. Paragraphs 214 are horizontally tiled, having horizontal margins 216 exposed. The next lower text hierarchy, sentences 218, are vertically tiled, having vertical margins 220 exposed.

The reader is able to visualize the location of the sentence being read within the paragraph, the paragraph within the page, the page within the chapter, and the chapter within the book. Using known three dimensional shading and perspective display techniques, e.g. planar edge shading and bevelling, nested planar text hierarchies can give the reader a three dimensional feel of the location of the text being read.

In one embodiment, the sentences are displayed in horizontally sliding planes, In another embodiment, the sentences are displayed in a series of horizontally tiled planes that slide horizontally, similar to paragraphs 214 in FIG. 22. In one embodiment, sentences are always set to be displayed as either horizontally or vertically tiled planes, with the higher ranked text hierarchies alternating as horizontally and vertically tiled planes.

In some text bodies, there may be a large number of units, for example, a very large number of pages in a chapter, or a book with no chapters. To deal with this situation, an artificial hierarchy can be created. In one embodiment, an "Order of Ten" hierarchy can be created. For example, if the number of chapters is greater than 50, an artificial unit of "10 Chapters" can be created. This artificial unit can be created as either a higher ranked text hierarchy to be displayed as such or simply as a unit of similar rank to be tiled the same but displayed differently. In one example, the unit of "10 Chapters" is tiled vertically while the chapters are tiled horizontally. In another example, the units of "10 Chapters" and chapters are both tiled horizontally, but with the "10 Chapter" unit having a darker color or otherwise different appearance.

Text Display Across Opposed Pages

Figure 23:
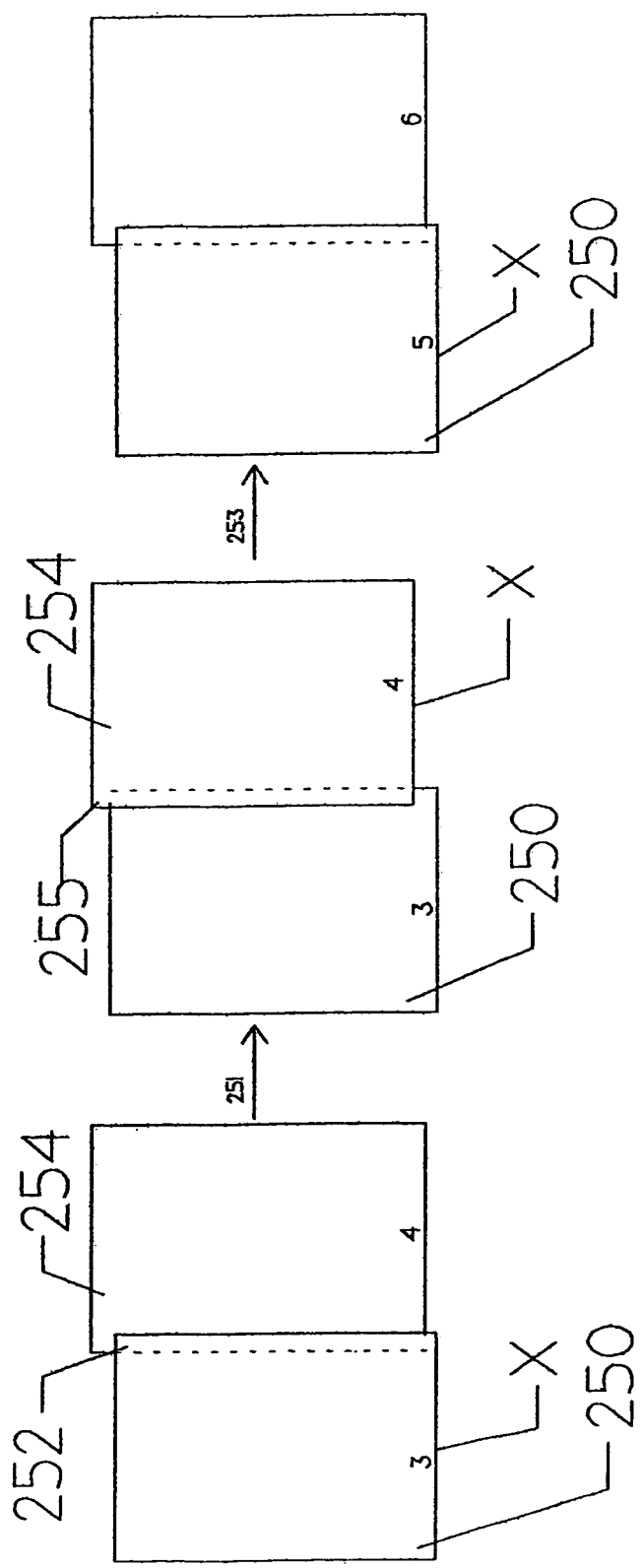
FIG. 23 illustrates a method for displaying text across multiple display pages.

In another aspect of the invention, a method for displaying text on subsequent pages is provided. Referring now to FIG. 23, a left page 250 having a right margin 252 is illustrated as is a right page 254 having a left margin 255, obscured by right margin 252. Page number 3 is displayed as left page 250 and page number 4 is displayed as right page 254. Page number 3 is indicated as being read by the "X." Upon completion of reading page number 3, this can be indicated to the reading system by reader action or by completion of a time interval. Upon completion of reading page number 3, indicated by arrow 251, page number 4 is displayed "in front of" page number 3, with right page 254 left margin 255 obscuring left page 250 right margin 252. Upon completion of reading page number 6, indicated by arrow 253, new pages are displayed, with page number 5 being displayed as left page 250 and page number 6 being displayed as right page 254. In this fashion, pages are alternated left and right to mimic the familiar pattern of paper books readers are accustomed to.

Figure 24:
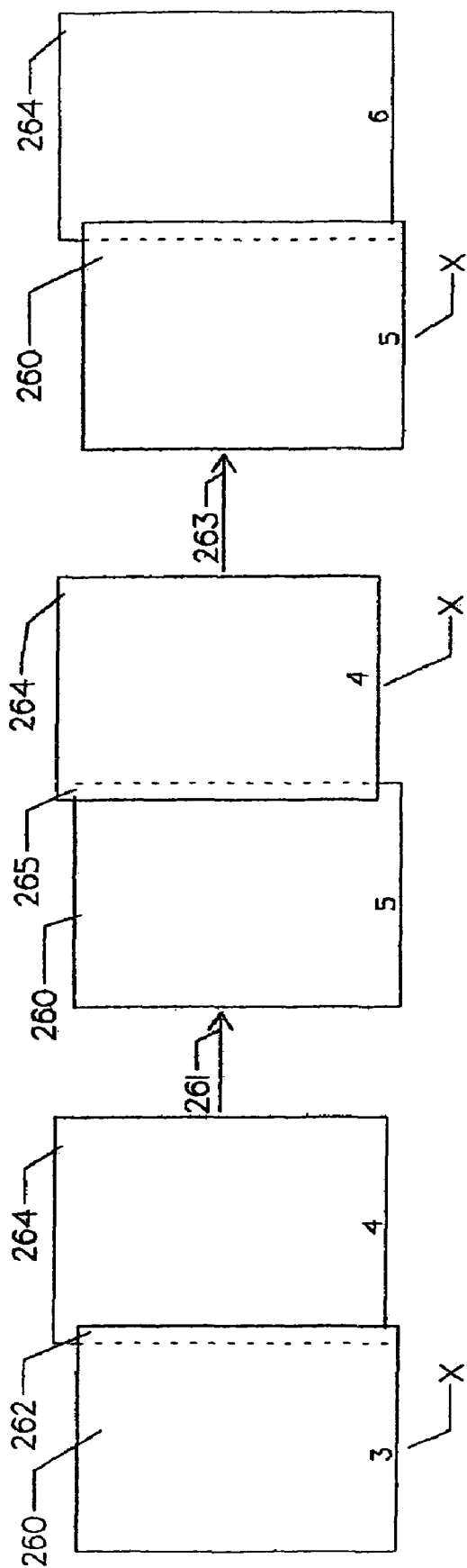
FIG. 24 illustrates another method for displaying text across multiple display pages.

Referring now to FIG. 24, another embodiment of the invention is illustrated. A left page 260 having a right margin 262 is illustrated as is a right page 264 having a left margin 265, obscured by right margin 262 page number 3 is displayed as left page 260 and page number 4 is displayed as right page 264. Page number 3 is indicated by the "X." Upon completion of reading page number 3, indicated by arrow 261, page number 4 is brought to the front such that left margin 265 obscures right margin 262. In addition, upon the reading completion of page 3, page number 3 is removed and replaced with page number 5. This configuration is not possible using traditional, paper bindings. Upon completion of reading page number 4, indicated by arrow 263, page number 5 is brought to the front and page number 4 is removed and replaced with page number 6.

The embodiment illustrated in FIG. 24 has the advantage of allowing text segments to be broken across pages while always providing the next page to be read on the screen. This allows the reader to advance from previously displayed text without having to wait for new display of text. For example, a text segment broken across page number 3 and 4 could be read by the reader without requiring a pause for the contents of page 4 to be displayed. A text segment broken across page numbers 4 and 5 could be read by the reader without requiring a pause for the contents of page 5 to be displayed. In essence, the reader is able to read electronically displayed text without having to wait for page flipping, while at the same time having the familiar presentation of text on opposing pages, a throw back to bound, paper books. The middle configuration of FIG. 24 is not bound by binding.

Text Display for Reading from Front to Back

Referring now to FIG. 25, another aspect of the invention is illustrated in a screen display of text 280, having a first text line 282, a second text line 284, a third text line 286, and a fourth text line 288. Using perspective illustration techniques, first line 282 can be made to appear closer to the reader than second line 284, second line 284 closer than third line 286, and third line 286 closer than fourth line 288. In one embodiment of the invention, text is displayed one screen or display page at a time, with all lines on the display, even the most distant lines, being readable. In one embodiment, the line actively being read is indicated as being brighter or having higher contrast than the lines of text not having been read. The line actively being read can be estimated by advancing a brightening line wide cursor at the rate of the reader's estimated reading speed. In a variation of this embodiment, a line wide translucent filter is advanced over the line actively read, such that text not being on the line being read appears slightly fuzzy and less readable than the text being read.

Referring now to FIG. 26, the display of FIG. 25 is illustrated as a modified display page 290, with the text having been advanced one line forward. First line 282 has been forced forward off the display while second line 284 is now at the forefront. In this embodiment of the invention, text can be advanced a line at a time, toward the reader. With current technology, the text can be made to scroll smoothly forward toward the reader. A perspective effect can be achieved by making the lower text lines with larger fonts and greater interline distances. Three dimensional fonts can also be used. In a preferred embodiment, the text is displayed as enhanced text after processing, using folding methods described above.

In an alternate embodiment, text is displayed to appear as being displayed from front to back when read from bottom to top, as described above. In this embodiment, the text is displayed statically, one screen at a time, with text being paged through in multiple line chunks rather than being smoothly scrolled through.

The embodiments illustrated in FIGS. 25 and 26 take advantage of the natural image processing selected for by human evolution. Specifically, humans, prior to reading, processed information while walking or otherwise moving forward, with newer information appearing first as further away and moving closer with time and movement through the landscape. English is written from top to bottom to allow the writer to read what has been written on the preceding line. Writing from bottom to top would cover up the lines just written with the writer's hand. This aspect is well known to left handed writers in a slightly different form. English is written from left to right, allowing right handed writers to see the words they have just written. Left handed writers cover up what they have just written, and often assume a cramped writing hand position in an attempt to compensate for this disadvantage. Publishing has heretofore adapted the top to bottom style used for handwritten text, without having to. The present invention frees text display from the top down convention, allowing display in a more natural, albeit unconventional display format.

Varying Transition Patterns with Text Levels

In another aspect of the invention, transition patterns between text displays is varied as a function of the level or hierarchy ranking of the text. In one embodiment, the transition between sentences within a paragraph is different than a transition between paragraphs. The transition between sentences can be varied as a function of the position of the sentence within the paragraph. The transition between paragraphs can be varied as a function of the position of the paragraph within the chapter or other text hierarchy within which it resides.

In one example of the invention, transition between paragraphs is accomplished by dissolving the just displayed sentence, before displaying the next sentence. The dissolve can be a fine grained dissolve for the first paragraph in a chapter, a coarse grained dissolve for the last paragraph in a chapter, and a continuum of granularity therebetween for intermediately positioned paragraphs. In another example of the invention, each successive sentence in a paragraph could be displayed starting either at a more rightward position, a more downward position, or both. In this way, successive sentences in a paragraph would march either rightward, downward, or both with the progression of the paragraph.

In another embodiment of the invention, a musical key, played by an instrument, is associated with a paragraph to be displayed. In one example, the same key and instrument is associated with every paragraph. A number of notes corresponding to the number of sentences in the paragraph is played down the scale in that key at the start of the display of the paragraph. At the beginning of the display of each sentence, the corresponding note in the scale is played up or down the scale. In a corresponding example, a number of notes corresponding to the number or location of that sentence is played. In one embodiment, if the sentence contained more than one clause, a chord is played. In one embodiment, if the sentence contained contrasting expressions such as "despite" or "however", a minor or discordant chord could be played. In one embodiment, a different instrument and/or key is used for every paragraph.

Temporal Protrusion

In another aspect of the invention, certain words are selected to protrude temporally from the other words in the sentence. The selected words in one example are displayed before the remaining words in the sentence are displayed. In another example, the selected words are displayed after the remaining words are no longer displayed. In yet another example, the selected words are displayed both prior to the remaining words being displayed and after the remaining words are no longer displayed. The displayed before or after the remaining words are believed to receive more attention from the reader. Words displayed prior to the remaining words are believed to register with and partially analyzed by the reader prior to the reading of the remainder of the sentence, this is believed to make the reader aware of the word such that the reader is not caught unaware and having to back track.

In one embodiment, the words are selected based on the difficulty the reader is predicted to have with the selected words. In one example, words above a certain educational level are selected for temporal protrusion. In another example, words having a sound-spelling mismatch are selected for temporal protrusion. A sound-spelling mismatch refers to words whose pronunciation is not deriveable from the spelling. In yet another example, a word frequency dictionary is used, and words used with low frequency are selected for temporal protrusion.

Prose Painting

In another aspect of the invention, color is used in conjunction with text analysis to display the interrelationship of parts of a sentence with another. One embodiment of this method can include the steps listed below.

a. Analyzing the sentence, subdividing the sentence into a plurality of text segments based on relationships of said text segments to each other.

b. Organizing said text segments into a tree having a root parent node and a plurality of parent nodes and child nodes.

c. Assigning each child node a attribute based on the relationship with the parent node.

d. Assigning the root node a color.

e. For each child node beneath the root node, assigning a color to each child node based upon the color of the parent node modified by the relationship between the child node and the parent node.

f. Repeating step e until all nodes have a color assigned.

g. Displaying said text in lines in substantially the same order specified by the author using the color assigned in the tree.

Figure 27:
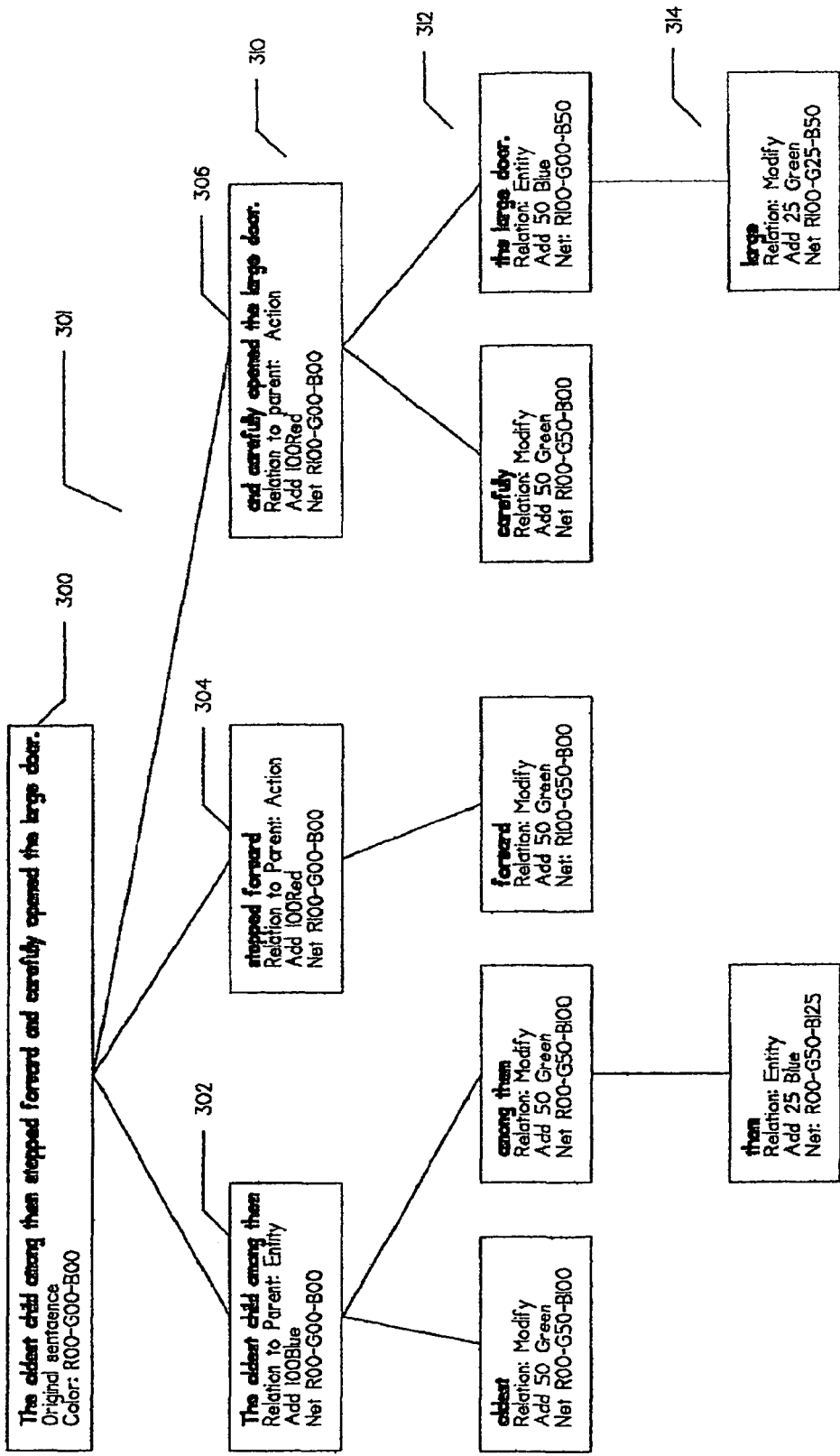
FIG. 27 is a tree diagram of a sentence subdivided for color assignment and prose painting.

Referring now to FIG. 27, in one embodiment of the above recited algorithm, the parent-child relationships are selected from the group consisting of entity, action and modification. An original sentence 300 is subdivided into three text segments 302, 304, and 306, as indicated by a tree 301. Text segment 302 has an entity relationship to parent 300, segment 304 has an action relationship to parent 300, and segment 306 has an action relationship to parent 300. Parent 300, in a generation 0 at 308 has an initial color triple (Red Green Blue) of R00-G00-B00, as indicated in segment 300. The amount of color added to each generation of child segments can be a function of the generation number itself. In FIG. 27, 100 units of color are added to a first child generation at 310, 50 units of color are added to a second generation 312, and 25 units of color are added to a third generation 314. The color itself is added as a function of the parent-child relationship. In FIG. 27, Blue is added for Entities, Red for Actions, and Green for Modifiers.

In FIG. 27, segment 302 is has an Entity relationship with parent 300 and is at the first generation level, so 100 units of Blue are added. The amount of color added is less at each generation. The function of each word in the sentence is thus influenced most by the function of the largest segment of which it is a part.

New Qualities Imparted by the Prose Paint Process

Speech is a communication system in which individual uttered units, such as words, have discrete meanings, and a larger meaning is constructed by the relationships among a group of words. The sequence of words is important structural information that is used to build the meaning of the relationships among the words. Within sequences of words, smaller sequences of words have special relationships among them. In this way, the order of two or more smaller sequences of words within a larger sequence of words is also a form of structural information that is used to build the meaning of the relationships among all the words.

In addition to selecting the order in which words are uttered, a speaker also pronounces each word, or group of words, with certain sound attributes that are in addition to the simple pronunciation of the phonemes that indicate what the word is. These additional sound attributes include the pitch, volume and timbre with which the words are spoken. These sound attributes commute and combine in that a particular word within a phrase will be modified relative to what these additional sound attributes are for the phrase as a whole.

These additional pronunciation attributes, such as pitch, volume and timbre, (hereinafter referred to as intonational attributes) therefore represent a multi-dimensional system of values that can be combined and which commute across successive levels of differentiation of word groups into smaller sub-units within the larger word groups. These values represent the relationship of the word (or words) to the larger unit of the group of words it was a part of.

In addition, each sub-unit is kept within a range of intonational values that is appropriate for its immediate context. A larger unit, which may contain several sub-units of its own, similarly will relate to the yet larger unit containing sub-units like itself, with a change in one these same intonational values that is appropriate for this larger context.

For example, a careful audition of the sentence: "The purple hat of the purple clown was put into a purple box."-will discern that the intonational values of each of the words "purple" appropriately set the word "purple" apart, in a tonal way, from the larger units the word "purple" is modifying in each case. In the first case, "The (purple) hat", is the principle entity of the sentence as a whole: the intonational value of "purple" in this case is built up from a baseline set of values used to represent the principle entity.

In the second case, the phrase "of the (purple) clown", itself is a segment that has a modifying relationship to the entire subject phrase. This second "purple" therefore has a lower volume than the first "purple" but still has a pitch that sets it apart, in a tonal way, from "clown", in the same way that the first "purple" set itself apart from "hat".

In the third case, the entire phrase—"was put into a purple box"—is varied in a different tonal dimension, (the timbre is sharper), to set it apart from the first half of the sentence, as a way of depicting that this segment is in an "action" dimension relative to the sentence. The sub-units of this phrase retain this baseline timbre dimension value, and then modify it by changing the intonational values of each sub-unit based on the relationship of the sub-unit to the larger segment they were a part of. In this way, the third "Purple" still has, in the smaller context of its relationship to "the (purple) box", a pitch that sets it tonally apart from "box", but it also carries a slightly sharper timbre than the first two "purple"s because it is also in the "action" dimension as a part of "was put into a (purple) box."

To further illustrate this intonational structure, notice how the word "hat" has two different sets of intonational values in the following sentence: "The purple hat of the purple clown was put into the hat box." The second "hat" in this sentence has a set of intonational values that denote its modifying properties for an entity ("box", the object) of the action segment ("was put into") of the sentence. In contrast, the first "hat" has a set of intonational values that place it as the principle entity of the sentence as a whole. The second "hat" in this second example sentence actually has a set of pitch, tone and volume values that is equivalent to the third "purple" in the first example sentence.

These dimensions of intonality in speech, as stated above, have combinable and commutable values. These dimensions of intonality are also transparent in that they are perceived simultaneously with the word unit that is carrying the individual word-meaning information: each spoken word is therefore carrying a packet of both semantic and syntactic information. In this way, the dimensions of intonality are non-annotative; that is, they do not require additional utterance. A person does not, for example, say before each phrase of a sentence. "Subject-the purple hat-modifier of subject-of the purple clown-verb-was put into-object-the purple box."

However, the existing methods of representing the relationships between groups of words in a sentence, such as parse trees or grammatical diagrams, are not transparent, but instead rely on additional annotation and symbols to label the word groups. These labels, in turn, are fixed and do not combine or commute values across successive levels of sub-unit differentiation, or limit such values according to their context.

It is therefore desirable that enhanced text presentation should enrich the appearance of the actual words of the text with visual attributes that are similar to the intonational attributes of speech. These visual attributes should create a multi-dimensional system of combinable and commutable values that represent attributes of the words in addition to their word-specific meanings. These visual attributes should also be transparent, i.e., perceivable simultaneously with the perception of the words themselves.

Moreover, unless a text presentation method systematically assures that the author-specified sequence of words is unambiguously represented, it is not text presentation as meant in this discussion, but simply a method to demonstrate the results of some narrow aspect of text analysis which subordinates the integrity of the author's message to the objectives of such an analysis.

The "Prose Paint" process described above uniquely represents these intonational conditions of speech in an unambiguous text presentation. In addition, the "Prose Paint" process is a novel approach to syntactic analysis itself, in that the properties of entity, action, and modification, which represent the relationships between child and parent segments, also combine and commute across successive levels of differentiation of a sentence.

In other words, it is not only that enhanced visual presentation of text should aspire to the conditions of speech, but that syntactic analysis itself should aspire to the conditions of intonality. A basic exercise for testing grammar rules in linguistic analysis is to create a series of words using the grammar rules and then to listen to the proposed sentence to determine if it "sounds right". It is possible, as illustrated by the previous discussion on intonational values, that the inner "reasoning" by which "complete sentences" are intuitively recognized as valid propositions is mediated by a multi-dimensional system of attributes for the relationships of sub-units to larger units whose outward expression is intonality. The mathematics of the mind may be musical.

The method can be used to display text using either the text folding described previously or using standard text displays, but in color. The method can also stop short of segmenting a sentence into words. For example, the algorithm can stop after a fixed number of levels, or leave phrases intact, leaving all words in the phrase with the same color.

Numerous characteristics and advantages of the invention covered by this document have been set forth in the forgoing description. It will be understood, however, that this disclosure is, in many respects, only illustrative. Changes may be made in details, particularly in matters of combining, separating, and arranging steps, without exceeding the scope of this invention. The invention's scope is, of course, defined in the language in which the appended claims are expressed.

What is claimed is:

1. In a data processing and display system, a computer executable process for simultaneous visual depiction of plural text hierarchies of a visually displayable machine readable text, including provisions for a visual cue as to a location of a user select text within the simultaneous visual depiction of plural text hierarchies, the process comprising the steps of:

a. extracting a text hierarchy for a reader select text of a machine read text accessible by at least the data processing portion of the data processing and display system, elements of said text hierarchy selected from the group consisting of, in descending rank order, volumes, sections, subsections, chapters, pages, paragraphs, and sentences;

b. formatting for display and displaying upon a display of the data processing and display system, units of a select element of elements of said text hierarchy as horizontally tiled plane sets, and units of an immediately subordinate rank order element of elements of said text hierarchy as vertically tiled plane sets; and, c. selecting a portion of text of the machine read text present in said select unit of a select element of elements of said text hierarchy such that when said selected portion of text is present in a hierarchy represented by a horizontally tiled plane, units of said select element of elements of said text hierarchy move apart substantially vertically, and such that when said selected portion of text is present in a hierarchy represented by a vertically tiled plane, units of said select element of elements of said text hierarchy move apart substantially horizontally, said selected unit of said select element of elements of said text hierarchy being further away from at least one other adjacent unit after said movement.

2. The process of claim 1 wherein units of a lower hierarchy are displayed in response to units of said select element of elements of said text hierarchy having been moved apart.

3. The process of claim 2 wherein said units of the lower hierarchy are tiled horizontally when moved apart hierarchy units are tiled vertically, said units of the lower hierarchy tiled vertically when said moved apart hierarchy units are tiled horizontally.

\* \* \* \* \*